US009871614B2

(12) United States Patent
Yoshida et al.

(10) Patent No.: US 9,871,614 B2
(45) Date of Patent: Jan. 16, 2018

(54) WDM/TDM-PON SYSTEM AND TRANSMISSION START TIME CORRECTION METHOD THEREOF

(71) Applicant: NIPPON TELEGRAPH AND TELEPHONE CORPORATION, Tokyo (JP)

(72) Inventors: Tomoaki Yoshida, Yokosuka (JP); Shin Kaneko, Yokosuka (JP); Shunji Kimura, Atsugi (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 15/327,449

(22) PCT Filed: Jul. 17, 2015

(86) PCT No.: PCT/JP2015/070535
§ 371 (c)(1),
(2) Date: Jan. 19, 2017

(87) PCT Pub. No.: WO2016/013509
PCT Pub. Date: Jan. 28, 2016

(65) Prior Publication Data
US 2017/0170923 A1    Jun. 15, 2017

(30) Foreign Application Priority Data

Jul. 22, 2014    (JP) .................... 2014-148624

(51) Int. Cl.
*H04J 14/00*    (2006.01)
*H04J 14/02*    (2006.01)
(Continued)

(52) U.S. Cl.
CPC ........ *H04J 14/0278* (2013.01); *H04B 10/077* (2013.01); *H04B 10/272* (2013.01);
(Continued)

(58) Field of Classification Search
CPC ............ H04B 10/0775; H04B 10/0795; H04B 10/077; H04B 10/272; H04J 14/0278;
(Continued)

(56) References Cited

U.S. PATENT DOCUMENTS 6,993,009 B2 *    1/2006    Kelly ................. H04B 7/18582
                                                 370/350
8,797,976 B2 *    8/2014    Hyoudou ................ H04L 12/44
                                                 370/235
(Continued)

FOREIGN PATENT DOCUMENTS

JP    2012-253417 A    12/2012
JP    2013-229743 A    11/2013

OTHER PUBLICATIONS

Kazutaka Hara et al., "Flexible load balancing technique using dynamic wavelength bandwidth allocation (DWBA) toward 100Gbit/s-class-WDM/TDM-PON", Tu.3.B.2,ECOC2010, Sep. 2010.
(Continued)

*Primary Examiner* — Hibret Woldekidan
(74) *Attorney, Agent, or Firm* — Harness, Dickey & Pierce, P.L.C.

(57) ABSTRACT

A transmission start time correction method of a WDM/TDM-PON system includes: a completion instruction procedure in which a station-side subscriber accommodation apparatus issues an instruction using a downstream signal for instructing a subscriber apparatus to perform wavelength switching, the downstream signal including a transmission start time of an upstream signal indicating completion of the wavelength switching of the subscriber apparatus, the upstream signal being transmitted by the subscriber apparatus after the wavelength switching; an instruction completion transmission procedure in which the subscriber apparatus transmits the upstream signal indicating the completion (Continued)

of the wavelength switching at a wavelength after switching at the instructed transmission start time after the wavelength switching is completed in accordance with the instruction; and a transmission start time correction procedure in which the station-side subscriber accommodation apparatus measures a reception time of the upstream signal indicating the completion of the wavelength switching received after the wavelength switching and sets a time obtained by adding a time twice a time difference between a reception time of the upstream signal indicating the completion of the wavelength switching assumed before the wavelength switching and a reception time of the upstream signal indicating the completion of the wavelength switching received after the wavelength switching to the transmission start time of the upstream signal before the wavelength switching as a new transmission start time.

16 Claims, 12 Drawing Sheets

(51) Int. Cl.
| | | |
|---|---|---|
| *H04J 14/08* | (2006.01) | |
| *H04L 7/00* | (2006.01) | |
| *H04L 12/44* | (2006.01) | |
| *H04B 10/077* | (2013.01) | |
| *H04B 10/272* | (2013.01) | |

(52) U.S. Cl.
CPC ...... *H04J 14/0269* (2013.01); *H04J 14/0272* (2013.01); *H04J 14/08* (2013.01); *H04L 7/0075* (2013.01); *H04L 12/44* (2013.01)

(58) Field of Classification Search
CPC .... H04J 14/08; H04J 14/0245; H04J 14/0227; H04J 14/0228; H04J 14/0246; H04J 14/0247; H04J 14/025; H04J 14/0252; H04J 14/0269; H04J 14/0272; H04L 7/0075

USPC .................................. 398/68, 67, 70, 71, 25
See application file for complete search history.

(56) References Cited

U.S. PATENT DOCUMENTS

| | | | | |
|---|---|---|---|---|
| 9,479,284 | B2* | 10/2016 | Kaneko | H04B 10/272 |
| 9,712,241 | B2* | 7/2017 | Mukai | H04B 10/27 |
| 2006/0210269 | A1* | 9/2006 | Farhadiroushan . | G01D 5/35364 |
| | | | | 398/48 |
| 2007/0092256 | A1* | 4/2007 | Nozue | H04J 14/0282 |
| | | | | 398/72 |
| 2013/0004172 | A1* | 1/2013 | Sugawa | H04J 3/1694 |
| | | | | 398/72 |
| 2013/0236170 | A1* | 9/2013 | Nishitani | H04L 12/2861 |
| | | | | 398/25 |
| 2015/0245395 | A1* | 8/2015 | Yamazaki | H04W 76/023 |
| | | | | 455/426.1 |
| 2015/0326337 | A1* | 11/2015 | Yoshida | H04L 12/44 |
| | | | | 398/48 |
| 2016/0269105 | A1* | 9/2016 | Yoshida | H04B 10/032 |
| 2017/0207875 | A1* | 7/2017 | Yoshida | H04J 14/025 |

OTHER PUBLICATIONS

S. Kimura, "WDM/TDM-PON Technologies for Future Flexible Optical Access Networks", 6A1-1, OECC 2010, Jul. 2010.
S.Tamaki et al., "λ-Tunable WDM/TDM-PON System for Future Optical Access Network", IEICE Technical Report, vol. 112, No. 118, Jul. 2012, with partial translation.
"IEEE Std, Local and metropolitan area networks Part 3: Carrier sense multiple access with Collision Detection (CSMA/CD) Access Method and Physical Layer Specifications (IEEE std 802.3™)", IEEE Computer Society, 2008.
T. Yoshida et al, "A Proposal of Dynamic Wavelength Switching Mechanism for λ-tunable WDM/TDM-PON System", IEICE General Conference, B-8-38, Mar. 2013, with partial translation.
International Search Report for PCT/JP2015/070535, ISA/JP, dated Oct. 6, 2015.

* cited by examiner

WDM/TDM-PON SYSTEM AND TRANSMISSION START TIME CORRECTION METHOD THEREOF

CROSS-REFERENCE TO RELATED APPLICATIONS

This application is a 371 U.S. National Stage of International Application No. PCT/JP2015/070535, filed Jul. 17, 2015, which claims the benefit of and priority to Japanese Patent Application No. 2014-148624, filed Jul. 22, 2014. The entire contents of the above applications are incorporated herein by reference.

TECHNICAL FIELD

The present invention relates to a wavelength division multiplexing/time division multiplexing-passive optical networks (WDM/TDM-PON) system in which wavelength division multiplexing is combined with time division multiplexing and to an upstream signal transmission start time correction method in the WDM/TDM-PON system.

BACKGROUND ART

With the recent rapid spread of the Internet, access service systems require high capacity, high functionality, and cost efficiency, and research on WDM/TDM-PON is being conducted as means for achieving such systems. A passive optical network (PON) is an optical communication system in which a plurality of subscriber apparatuses (optical network units (ONUs)) share a single station-side subscriber accommodation apparatus (an optical line terminal (OLT)) and part of a transmission path using an optical multiplexer/demultiplexer composed of optical passive elements, thereby reducing cost.

At present, in Japan, a gigabit Ethernet passive optical network (GE-PON) (Ethernet is a registered trademark), which is an economic optical subscriber system in which a maximum of 32 users share a line capacity of 1 gigabits per second (Gbps) in accordance with time division multiplexing (TDM), is mainly introduced. Thereby, a fiber to the home (FTTH) service is provided at a reasonable fee.

Also, research on 10G-EPON in which the total bandwidth is in a 10 Gbps class is being conducted as the next-generation optical subscriber system in order to cope with the need for larger capacities, and the international standardization thereof was completed in 2009. This is an optical subscriber system for achieving a large capacity while using the same transmission path, such as optical fibers, as that of the GE-PON by increasing the bit rate of the transceiver.

Further, it is considered that a large capacity exceeding the 10G class for ultra-high-definition video services and ubiquitous services is required in the future, but there is a problem in that even if the bit rate of the transceiver is simply increased from the 10G class to the 40/100G class, practical application is difficult because of an increase of cost required to upgrade the system.

As means for solving this problem, a wavelength-tunable WDM/TDM-PON in which wavelength tunability is added to a transceiver and time division multiplexing (TDM) is effectively combined with wavelength division multiplexing (WDM) so that the transceiver in the OLT can be upgraded step by step in accordance with a required bandwidth amount has been reported (e.g., see Non-Patent Document 1).

As in Non-Patent Document 2, the wavelength-tunable WDM/TDM-PON system has recently attracted attention as a system in which a stepwise upgrade of the total bandwidth and flexible load balancing in accordance with demands of users are possible, and a dynamic wavelength bandwidth allocation algorithm is used to change line cards (optical subscriber units (OSUs)) belonging to the OLT in accordance with load balancing at the time of the stepwise upgrade of the total bandwidth. Dynamic wavelength and bandwidth allocation (DWBA) is achieved by combining upstream dynamic bandwidth allocation (DBA) from the ONUs in the belonging OSUs with wavelength switching for switching the belonging OSUs.

FIGS. 1, 2, and 12 show the configuration of a wavelength-tunable WDM/TDM-PON system and the configurations of a station-side subscriber accommodation apparatus (OLT) 100 and subscriber apparatuses (ONUs) 200, which configure the system. The OLT 100 and the ONUs 200 are connected with PON topology of a point-to-multipoint configuration using power splitters or wavelength routers 140 and 150.

In FIG. 1, the OLT 100 includes OSUs 120 of line cards OSU #1 to OSU #m for transmitting and receiving signals of wavelength sets of $\lambda 1d,u$ to $\lambda md,u$, a dynamic wavelength bandwidth allocation circuit 110, and a multiplexing/demultiplexing unit 130. The OSUs 120 of OSU #1 to OSU #m transmit and receive the signals of the wavelength sets of $\lambda 1d,u$ to $\lambda md,u$ to and from the ONUs 200. The h ONUs 200 of ONU #1 to ONU #h are connected to the OLT 100 and each ONU 200 performs transmission and reception using one of the wavelength sets of $\lambda 1d,u$ to $\lambda md,u$, each of which is a set of a downstream wavelength and an upstream wavelength. The ONUs 200 can perform transmission and reception while switching signals of wavelength sets of $\lambda 1d,u$ to $\lambda md,u$ in accordance with an instruction from the OLT 100.

An upstream signal from a communication apparatus (not shown) in a user's home in which each ONU 200 is installed is input to each ONU 200 and the upstream signal is transmitted as an upstream optical signal by an optical transceiver within each ONU 200. Upstream signals are multiplexed into one optical fiber from the power splitter or the wavelength router 150 on the ONU 200 side toward the OLT 100. Thus, the OLT 100 calculates and controls the transmission time and the transmission duration of the upstream signal transmitted by each ONU 200 so that the upstream signals do not overlap with each other. Upstream signals 1 to m received by the OSUs 120 of OSU #1 to OSU #m are aggregated by the multiplexing/demultiplexing unit 130 in the OLT 100, multiplexed into one upstream signal, and transmitted to a relay network 300 side. On the other hand, a downstream signal from the relay network 300 side to each ONU 200 is separated into downstream signals 1 to m for the OSUs 120 of OSU #1 to OSU #m by the multiplexing/demultiplexing unit 130 based on destination ONU information written in the downstream signals and OSU information regarding belonging ONUs 200. The separated downstream signals 1 to m are transmitted to the ONUs 200 at wavelengths of $\lambda 1d$ to $\lambda md$ of OSUs #1 to #m. Although the downstream signals are broadcast with the wavelengths of the OSUs 120, transmission and reception wavelengths of an ONU 200 are set to transmission and reception wavelengths of the OSU 120 to which the ONU 200 belongs, and thus the ONU 200 selects information destined to the ONU itself from signals of received wavelengths and outputs the selected information to a communication apparatus in a user's home.

The dynamic wavelength bandwidth allocation circuit 110 includes a DWBA calculation unit 112, a switching instruction signal generation unit 111, a control signal transmission unit 113, and a request signal reception unit 114. The request signal reception unit 114 receives a signal including a bandwidth request transmitted from each ONU 200 via each OSU 120, the DWBA calculation unit 112 calculates transmission times and transmission durations of an upstream data signal and a request signal allocated to each ONU 120 based on the request, the switching instruction signal generation unit 111 generates an instruction signal storing information thereof, and the control signal transmission unit 113 transmits the instruction signal to each ONU 200 via each OSU 120. Also, the DWBA calculation unit 112 manages connection information between the OSUs 120 and the ONUs 200 connected to one power splitter or wavelength router 150. When the wavelength is switched, with respect to an ONU 200 that has changed the wavelength, the DWBA calculation unit 112 instructs the multiplexing/demultiplexing unit 130 to change the transfer destination OSU 120 of the downstream signal of which destination is the ONU 200.

FIG. 12 is an example in which OSUs #n+1 to #m are arranged in another OLT #2 and OLT #1 and OLT #2 are arranged at physically different positions, unlike FIG. 1. It is possible to allow a user's communication to continue by wavelength switching if another station building is safe even for a large-scale disaster, such as a case in which the overall station building suffers from a disaster, by arranging the OSUs 120 at physically different positions in this manner. At this time, because it is necessary to transfer ONU control of OLT #1 to OLT #2 or transfer ONU control of OLT #2 to OLT #1, a link for a control signal to be used for transmitting and receiving the control signal is connected between the dynamic wavelength bandwidth allocation circuit 110 of OLT #1 and the dynamic wavelength bandwidth allocation circuit 110 of OLT #2. Although FIG. 12 shows a link for directly connecting OLT #1 and OLT #2, OLT #1 and OLT #2 may be connected via the relay network 300. In the configuration of FIG. 12, it is anticipated that each of fiber lengths between the power splitter or wavelength router 140 provided on the OLT 100 side and OSUs #1 to #n is different from each of fiber lengths between the power splitter or wavelength router 140 and OSUs #n+1 to #m.

FIG. 2 shows the configuration of the ONU. The ONU is configured to include a data reception unit 211, a data transmission unit 223, an upstream buffer memory 212, a downstream buffer memory 222, a destination analysis selection reception unit 221, a frame transmission control unit 213, a frame assembly transmission unit 214, a wavelength-tunable optical transceiver 201, a required bandwidth calculation unit 205, a request signal transmission unit 204, an instruction signal reception unit 202, and a wavelength switching control unit 203.

An upstream signal from a user is received by the data reception unit 211 and temporarily stored in the upstream buffer memory 212. The frame transmission control unit 213 transmits the upstream signal to the frame assembly transmission unit 214 in accordance with a transmission time and transmission duration of the upstream signal designated by an instruction signal. The frame assembly transmission unit 214 configures a frame having a format necessary for transmitting a signal to the OLT in the WDM/TDM-PON configuration and transmits the frame to the wavelength-tunable optical transceiver 201. The wavelength-tunable optical transceiver 201 converts the frame into an optical signal of one of wavelengths $\lambda 1u$ to $\lambda mu$ designated by the wavelength switching control unit 203 and transmits the optical signal to the OLT 100. The wavelength-tunable optical transceiver 201 selects the designated wavelength and receives a downstream signal from the OSU 120 and the destination analysis selection reception unit 221 analyzes the destination of the downstream signal, selects only information destined to the ONU itself, and stores the selected information in the downstream buffer memory 222. The data transmission unit 223 transmits the information stored in the downstream buffer memory 222 as a downstream signal for the user.

The wavelength-tunable optical transceiver 201 receives the instruction signal from the OLT 100, converts the instruction signal into an electrical signal, and transmits the electrical signal to the instruction signal reception unit 202. The instruction signal reception unit 202 analyzes instruction content of the instruction signal, and transmits a switching destination wavelength and a switching execution instruction to the wavelength switching control unit 203 as wavelength switching control at a designated time if a wavelength switching instruction, a wavelength after switching, and a switching start time are included in the instruction signal. The wavelength switching control unit 203 switches the wavelength of the wavelength-tunable optical transceiver 201 in accordance with the wavelength switching control.

Also, the OLT 100 receives information of a bandwidth requested by the ONU 200 from the ONU 200 and uses the received information in allocation of the bandwidth. There are various methods therefor, and, for example, the OLT 100 instructs the ONU 200 to transmit information of the required bandwidth to the OLT 100 using the instruction signal, and the ONU 200 writes the information of the required bandwidth for the OLT 100 in a request signal in accordance with the instruction. In this case, when the instruction signal reception unit 202 receives an instruction for requesting transmission of a request signal, the instruction signal reception unit 202 instructs the request signal transmission unit 204 to generate the request signal. The request signal transmission unit 204 instructs the required bandwidth calculation unit 205 to calculate the required bandwidth. The required bandwidth calculation unit 205 measures an amount of data of an upstream signal stored in the upstream buffer memory 212, determines a required bandwidth amount based on the amount of data, and transmits the required bandwidth amount to the request signal transmission unit 204. The request signal transmission unit 204 generates a request signal in which the required bandwidth amount is written and transmits the request signal to the frame transmission control unit 213.

The instruction signal may include information of a transmission start time and transmission duration of a request signal. In this case, the instruction signal reception unit 202 transmits the information of the transmission start time and the transmission duration of the request signal included in the instruction signal to the frame transmission control unit 213, the frame transmission control unit 213 transmits the request signal to the frame assembly transmission unit 214 at an instructed time, and the frame assembly transmission unit 214 transmits the request signal to the OLT 100 via the wavelength-tunable optical transceiver 201. Also, the instruction signal transmitted from the OLT 100 includes the transmission start time and the transmission duration with respect to transmission of an upstream signal from the user side, which is received by the ONU 200, to the OLT. The request signal transmission unit 204 transmits information of the transmission start time and the transmission duration of the upstream signal included in the instruction signal to the frame transmission control unit 213, the frame transmission control unit 213 extracts a frame of the upstream signal from the upstream buffer memory 212 at the instructed time and transmits the frame to the frame assembly transmission unit 214 for only a period of the transmission duration, and the frame assembly transmission unit 214 transmits the frame to the OLT 100 via the wavelength-tunable optical transceiver 201.

PRIOR ART DOCUMENTS

Non-Patent Documents

Non-Patent Document 1: Kazutaka Hara et al, "Flexible load balancing technique using dynamic wavelength bandwidth allocation (DWBA) toward 100 Gbit/s-class-WDM/TDM-PON", Tu.3.B.2, ECOC2010, September, 2010

Non-Patent Document 2: S. Kimura, "WDM/TDM-PON Technologies for Future Flexible Optical Access Networks", 6A1-1, OECC2010, July, 2010

Non-Patent Document 3: Tamaki et al., "λ-Tunable WDM/TDM-PON System for Future Optical Access Network", IEICE Technical Report, vol. 112, no. 118, pp. 39-44, July, 2012

Non-Patent Document 4: "IEEE Std, Local and metropolitan area networks Part 3: Carrier sense multiple access with Collision Detection (CSMA/CD) Access Method and Physical Layer Specifications (IEEE std 802.3)", IEEE Computer Society, 2008

Non-Patent Document 5: Yoshida et al, "A Proposal of Dynamic Wavelength Switching Mechanism for λ-tunable WDM/TDM-PON System", IEICE General Conference, B-8-38, March, 2013

SUMMARY OF INVENTION

Problems to be Solved by the Invention

Non-Patent Document 4 describes a rule in which a transmission start time and transmission duration of an upstream data frame of each ONU 200 belonging to the OSU 120 are calculated in accordance with a bandwidth allocation request using a report frame from the ONU 200, and the OSU 120 or the OLT 100 notifies the ONU 200 of the transmission start time and the transmission duration using a gate frame. Non-Patent Document 4 also describes a rule in which time information (a local time) of the OLT 100 is written in a control frame such as a gate frame to be transmitted to the ONU, the control frame is transmitted, and the ONU 200 synchronizes the time of the ONU itself with the local time written in the frame every time the ONU 200 receives the control frame. Non-Patent Document 5 proposes a procedure of changing a belonging OSU 120 by means of wavelength switching of the ONU 200 in which a gate frame and a report frame are extended as a wavelength switching instruction and a switching completion message. (Related Art 1)

FIG. 3 is a first related art of a procedure of performing wavelength switching using a gate frame and a report frame. It is assumed that the OLT 100 installs OSU #1 using a wavelength set of λ1$d,u$ and OSU #2 using a wavelength set of λ2$d,u$ and ONU #1 initially belongs to OSU #1 using the wavelength set of λ1$d,u$. It is assumed that the transmission and reception of the gate frame and the report frame are performed, a cycle for performing allocation calculation of an upstream frame for each ONU 200 is referred to as a DWBA cycle, and, in FIG. 3, the period of an $i^{th}$ DWBA cycle is referred to as T_dwba_i. Also, it is assumed that in order to change the OSU 120 to which ONU #1 belongs from OSU #1 to OSU #2, the OLT 100 determines that wavelength switching be instructed to ONU #1. Also, as described in Non-Patent Document 4, it is assumed that the ONU 200 is synchronized with the local time written in the gate frame every time the gate frame from the OSU 120 is received. Also, it is assumed that all OSUs 120 are synchronized with a common time within the OLT 100.

First, a gate frame (a tuning gate frame) g1_$i$ for instruction of wavelength switching is transmitted from OSU #1 to ONU #1. Information of a wavelength switching start time T_1 and switching destination wavelengths, i.e., λ2$d,u$, and a transmission time Tsr and transmission duration of rep1_$i+$1, which is a report (complete) frame to be transmitted by ONU #1 to OSU #2 after wavelength switching, are written in g1_$i$. ONU #1 starts wavelength switching from a designated time T_1. Assuming that the maximum time required for ONU #1 to perform the wavelength switching is denoted as T_lmax, ONU #1 completes switching to λ2$d,u$ after the passage of T_lmax from T_1. Thereafter, the report (complete) frame rep1_$i+1$ transmitted at the time Tsr of ONU #1 at the wavelength λ2$u$ is received by OSU #2 at a time Trr of the OLT 100, and ONU #2 recognizes the completion of the wavelength switching of ONU #1 upon receipt of this report (complete) frame. Bandwidth request information of ONU #1 may be written in a report (complete) frame and bandwidth allocation calculation of an upstream signal in a (T_dwba_i+1) cycle may be performed using the information.

Assuming that OSU #1 is synchronized with a local time written in a gate frame, the transmission time Tsr of the report (complete) frame written in the tuning gate frame g1_$i$ by OSU #1 is designated as a time obtained by subtracting a one-way propagation delay time from Trr so that OSU #2 receives the report (complete) frame at the time Trr. Thus, as described in Non-Patent Document 4, a one-way propagation delay or a round-trip propagation delay (a round trip time (RTT)) is measured at the time of an initial connection of ONU #1. Moreover, OSU #2 calculates the transmission start time Tsr and the transmittable time (transmission duration) of an upstream frame which are instructed using a gate frame for each ONU 200 and allocates the transmission start time Tsr and the transmittable time to each ONU 200 so that upstream frames of other ONUs 200 belonging to OSU #2 do not arrive within the transmittable time from the time Tsr. The same control as the above-described control is performed on transmission timings of normal gate frames, normal report frames, and normal upstream frames as in Non-Patent Document 4 as well as the gate frame and the report frame for wavelength switching. This is an important control method for preventing upstream frames from different ONUs 200 from colliding in the OSU 120 in a time division multiplexing access scheme of PON.

However, as in FIGS. 1 and 12, if the distances between the OSUs 120 and the power splitter or the wavelength router 140 installed on the OLT 100 side are different from each other, the distance between the OLT 100 and the ONU 200 varies depending on the OSU 120 and an RTT of the ONU 200 that has performed the wavelength switching with the OLT 100 changes after the wavelength switching. Also, the wavelength-tunable WDM/TDM-PON assumes to use a different wavelength set for each OSU 120. For example, because λ1$d,u$ used in OSU #1 and λ2$d,u$ used in OSU #2 are different in wavelength, the RTT at the time of using $\lambda 1d,u$ is different from that at the time of using $\lambda 2d,u$ due to an influence of chromatic dispersion of an optical fiber (hereinafter abbreviated as "fiber dispersion") even when the length of an optical fiber from OSU #1 to ONU #1 is the same as the length of an optical fiber from OSU #2 to ONU #1. Next, a description will be given in which this causes a problem in timing control of an upstream signal after wavelength switching in related art 1 shown in FIG. 3.

First, the case in which the report (complete) frame rep_i+1 is transmitted will be described with reference to FIG. 4. FIG. 4 assumes that OSU #1 and OSU #2 are arranged at the same position for the sake of simplicity, and shows the case in which ONU #1 is virtually far as shown by ONU #1' and the case in which ONU #1 is virtually close as shown by ONU #1" when wavelength switching to $\lambda 2d,u$ is performed and thus an RTT between the OLT and ONU #1 changes due to a change of a fiber path via which the frame traverses and fiber dispersion. When a report (complete) frame rep1'+1 is transmitted at a transmission start time Tsr instructed by a tuning gate frame g_i, at the position of ONU #1', the report (complete) frame rep1'_i+1 arrives at a time which is later than a time Trr at which OSU #2 assumes reception. When this delay time is denoted as T'ulag, T'ulag is equal to a time at which a signal arrives at the position of ONU #1 when the signal is transmitted at $\lambda 2u$ from ONU #1'. Likewise, when ONU #1" transmits a report (complete) frame rep1"_i+1 at the transmission start time Tsr instructed by the tuning gate frame g_i, the report (complete) frame rep1"_i+1 arrives at a time which is T"ulag earlier than the time Trr at which OSU #2 assumes reception. T"ulag is equal to a time at which a signal arrives at ONU #1" when the signal is transmitted from ONU #1 at $\lambda 1u$. At this time, if upstream signal timing control of OSU #2 performs control so that an upstream frame of another ONU 200 is received before or after rep1_i+1, the upstream frame of the other ONU 200 collides with rep1'_i+1 or rep1"_i+1, and it is impossible to receive a report (complete) frame, i.e., it is impossible to recognize the completion of the wavelength switching of ONU #1.

Also, even when there is accidentally no upstream signal before and after Trr and a report (complete) frame can be received, another problem occurs in the reception of upstream data. FIG. 5 is a diagram showing this situation. The definitions of ONU #1' and ONU #1" are the same as those of FIG. 4.

FIG. 5 shows allocation of an upstream signal after rep1_i+1 is received. OSU #2 writes Tg2_i+1 which is a local time of OSU #2, a time Tsr at which ONU #1 transmits an upstream signal, and transmission duration in a gate frame g1_i+1 and transmits the gate frame g1_i+1 to ONU #1. OSU #2 assumes that ONU #1 receives g1_i+1 at a position of ONU #1 of FIG. 5 and the time of ONU #1 is synchronized with Tg2_i+1. However, because ONU #1 is actually located at the position of ONU #1' or ONU #1", it is synchronized with Tg2_i+1 with an arrival time difference T'dlag between ONU #1' and ONU #1 at a downstream wavelength $\lambda 2d$ or an arrival time difference T"dlag between ONU #1 and ONU #1" at the downstream wavelength $\lambda 2d$. Thus, the time at which transmission of an upstream data frame data1_i+1 starts is originally designated as Tsr, but data1"_i+1 is actually transmitted at a time T"sr which is T"dlag earlier than the time Tsr or data1'_i+1 is actually transmitted at a time T'sr which is T'dlag later than the time Tsr. Also, data1"_i+1 which is an upstream data frame has an arrival time difference delayed by T'ulag as compared with the case in which it is simultaneously transmitted from ONU #1 and data1"_i+1 has an arrival time difference advanced by T"ulag. Thus, an upstream data frame which arrives at OSU #2 is received at a time which is (T"dlag+T"ulag) earlier than the reception time Trr assumed by OSU #2 in the case of ONU #1" and is received at a time which is (T'dlag+T'ulag) later than the reception time Trr in the case of ONU #1'. At this time, when upstream signal timing control of OSU #2 performs control so that an upstream frame of another ONU 200 is received before or after data1_i+1, the upstream frame of the other ONU 200 collides with data1'_i+1 or data1"_i+1, and an upstream data frame cannot be received, i.e., an upstream frame of ONU #1 cannot be received.

(Related Art 2)

FIG. 6 is another example of a procedure of performing wavelength switching using a gate frame and a report frame described in Non-Patent Document 5. A feature of the present procedure is that the procedure can deal with the case in which a time T_lmax required for wavelength switching of the ONU 200 extends over a plurality of DWBA cycles. Wavelength sets used in OSU #1 and OSU #2 of the OLT 100 and an OSU to which ONU #1 initially belongs, and the definition of the DWBA cycle are similar to those of FIG. 3. Also, similarly to FIG. 3, it is assumed that in order to change the OSU 120 to which ONU #1 belongs from OSU #1 to OSU #2, the OLT 100 determines to instruct ONU #1 to perform wavelength switching in a cycle T_dwba_i−1. Also, every time the ONU 200 receives a gate frame, it is synchronized with time information (a local time) written in the gate frame. Also, it is assumed that all the OSUs 120 are synchronized with a common time within the OLT 100.

In the example of FIG. 6, first, a gate frame (a tuning gate frame) g1_i−1 for instructing wavelength switching is transmitted from OSU #1 to ONU #1. Information of a wavelength switching start time T_1 and switching destination wavelengths, i.e., $\lambda 2d,u$, is written in g1_i−1. ONU #1 starts wavelength switching from T_1. When the maximum time required for the wavelength switching by the ONU 200 is denoted as T_lmax, ONU #1 completes switching to $\lambda 2d,u$ after the passage of T_lmax from T_1. Next, OSU #2 transmits a gate frame g1_i+1 for the destination of ONU #1 at a wavelength $\lambda 2d$ in order to confirm wavelength switching completion of ONU #1. This gate frame is transmitted during a plurality of DWBA cycles until the wavelength switching procedure is completed, so that it is possible to confirm the completion of the wavelength switching without accurately ascertaining a wavelength switching time of each of the ONUs 200 even for the ONUs 200 having variation in T_lmax. The transmission start time Tsr and the transmission duration of a report (complete) frame indicating that ONU #1 has completed the wavelength switching are written in g1_i+1. ONU #1 receiving g1_i+1 transmits a report (complete) frame rep1_i+2 at a time Tsr at the wavelength $\lambda 2u$. rep1_i+2 is received by OSU #2 at a time Trr of the OLT 100, and OSU #2 confirms the completion of the wavelength switching of ONU #1 upon receipt of the report (complete) frame. Bandwidth request information of ONU #1 may be written in the report (complete) frame, and OSU #2 may perform the calculation of allocation of an upstream frame in a (T_dwba_i+2) cycle using the bandwidth request information.

Assuming that ONU #1 is synchronized with the local time written in the gate frame as in the example shown in FIG. 3, the transmission start time Tsr of the report (complete) frame written in the gate frame g1_i+1 by OSU #1 is designated as a time obtained by subtracting a one-way propagation delay time from Trr so that OSU #2 transmits the report (complete) frame at the time Trr. Thus, as described in Non-Patent Document 4, a one-way propagation delay or a round-trip propagation delay time RTT (a round-trip time) is measured at the time of an initial connection of ONU #1. Moreover, OSU #2 calculates a transmission start time and a transmittable time (transmission duration) of an upstream frame which are instructed using a gate frame for each ONU 200 and allocates the transmission start time and the transmittable time to each ONU 200 so that upstream frames of other ONUs 200 belonging to OSU #2 do not arrive within the transmittable time from the time Tsr.

However, if the distances between the OSUs 120 in FIG. 1 and the power splitter or the wavelength router 140 installed on the OLT 100 side are different from each other, the distances between the OLT 100 and the ONU 200 varies depending on the OSU 120 and the RTT between the OLT and the ONU changes. Also, the wavelength-tunable WDM/TDM-PON uses a different wavelength set for a different OSU 120. For example, because wavelengths $\lambda 1d,u$ used in OSU #1 are different from wavelengths $\lambda 2d,u$ used in OSU #2, it can be seen that the RTT between the OLT and the ONU at the time of using $\lambda 1d,u$ is different from that at the time of using $\lambda 2d,u$ due to an influence of dispersion of optical fibers even when a signal is passed through the same optical fibers. A description will be given in which this causes a problem in timing control of the upstream signal in the wavelength switching shown in FIG. 6.

FIG. 7 shows a change in a transmission start time of an upstream signal rep1_$i$+2 due to an influence of an arrival time difference of an upstream optical signal caused by the differences between the distances between a certain ONU 200 and OSUs 120 (the differences between the lengths of optical fibers connecting a certain ONU 200 and OSUs 120, hereinafter referred to as a "fiber distance difference" or an "optical fiber distance difference") and/or fiber dispersion. Similarly to FIGS. 4 and 5, FIG. 7 assumes that OSU #1 and OSU #2 are arranged at the same position, and shows the case in which ONU #1 is virtually far as shown by ONU #1' and the case in which ONU #1 is virtually close as shown by ONU #1" when wavelength switching to $\lambda 2d,u$ is performed and thus an RTT between the OLT and the ONU changes due to a change of a fiber path via which a frame traverses and/or fiber dispersion. OSU #2 writes Tg2_$i$+1 which is a local time of OSU #2, a time Tsr at which ONU #1 transmits an upstream signal, and transmission duration in a gate frame g1_$i$+1 and transmits the gate frame g1_$i$+1 to ONU #1 that has completed the wavelength switching. OSU #2 assumes that ONU #1 receives g1_$i$+1 at a position of ONU #1 of FIG. 7 and the time of ONU #1 is synchronized with Tg2_$i$+1. However, because ONU #1 is actually located at the position of ONU #1' or ONU #1", it is synchronized with Tg2_$i$+1 with an arrival time difference T'dlag between ONU #1' and ONU #1 at a downstream wavelength $\lambda 2d$ or an arrival time difference T"dlag between ONU #1 and ONU #1" at the downstream wavelength $\lambda 2d$. Thus, the time at which the transmission of the upstream report (complete) frame rep1_$i$+2 starts is originally designated as Tsr, but rep1"_$i$+2 is actually transmitted at a time T"sr which is T"dlag earlier than the time Tsr or rep1'_$i$+2 is actually transmitted at a time T'sr which is T'dlag later than the time Tsr. Also, rep1"_$i$+2 which is an upstream report (complete) frame from ONU #1" has an arrival time difference advanced by T"ulag as compared with the case in which it is transmitted from ONU #1 at the same time, and rep1_$i$+2 from ONU #1' has an arrival time difference delayed by T'ulag. Thus, an upstream report (complete) frame which arrives at OSU #2 is received at a time which is (T"dlag+T"ulag) earlier than a reception time Trr assumed by OSU #2 in the case of ONU #1" and is received at a time which is (T'dlag+T'ulag) later than the reception time Trr in the case of ONU #1'. At this time, if upstream signal timing control of OSU #2 perform control so that an upstream frame of another ONU 200 is received before or after rep1_$i$+2, the upstream frame of the other ONU 200 collides with rep1_$i$+2 or rep1"_$i$+2, and an upstream report (complete) frame cannot be received, i.e., the completion of wavelength switching of ONU #1 cannot be recognized.

As long as the difference of the time Tsr is not corrected, the collision of the upstream frames due to the arrival time difference in FIG. 7 is similarly caused with respect to a subsequent upstream data frame as well as the report frame.

The problems shown in the examples of the above-described two related arts not only impedes upstream communication of ONU #1, but also affects communication of another user who belongs to OSU #2 because it is a factor of loss of a frame in upstream communication of another ONU 200 adjacent to an upstream frame of ONU #1.

In order to solve the above-described problems, an object of the present invention is to prevent upstream signals from colliding in a station-side subscriber accommodation apparatus after wavelength switching.

Means for Solving the Problems

To achieve the above-described object, a station-side subscriber accommodation apparatus measures a reception time of the upstream signal indicating the completion of the wavelength switching received after the wavelength switching and sets a time obtained by adding a time twice a time difference between a reception time of the upstream signal indicating the completion of the wavelength switching assumed before the wavelength switching and a reception time of the upstream signal indicating the completion of the wavelength switching received after the wavelength switching to the transmission start time of the upstream signal before the wavelength switching as a new transmission start time.

Specifically, the present invention is a transmission start time correction method in a WDM/TDM-PON system in which a station-side subscriber accommodation apparatus and a plurality of subscriber apparatuses are connected by PON topology and a subscriber apparatus switches a transmission wavelength, a transmission start time, and transmission duration in accordance with an instruction from the station-side subscriber accommodation apparatus, the transmission start time correction method including:

a completion instruction procedure in which the station-side subscriber accommodation apparatus issues an instruction using a downstream signal for instructing the subscriber apparatus to perform wavelength switching, the downstream signal including the transmission start time of an upstream signal indicating completion of the wavelength switching of the subscriber apparatus, the upstream signal being transmitted by the subscriber apparatus after the wavelength switching;

an instruction completion transmission procedure in which the subscriber apparatus transmits the upstream signal indicating the completion of the wavelength switching at a wavelength after switching at the instructed transmission start time after the wavelength switching is completed in accordance with the instruction; and a transmission start time correction procedure in which the station-side subscriber accommodation apparatus measures a reception time of the upstream signal indicating the completion of the wavelength switching received after the wavelength switching and sets a time obtained by adding a time twice a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

Specifically, the present invention is a transmission start time correction method in a WDM/TDM-PON system in which a station-side subscriber accommodation apparatus and a plurality of subscriber apparatuses are connected by PON topology and a subscriber apparatus switches a transmission wavelength, a transmission start time, and transmission duration in accordance with an instruction from the station-side subscriber accommodation apparatus, the transmission start time correction method including:

a wavelength switching procedure in which the station-side subscriber accommodation apparatus instructs the subscriber apparatus to perform wavelength switching and the subscriber apparatus performs the wavelength switching in accordance with the instruction;

a transmission instruction procedure in which the station-side subscriber accommodation apparatus issues an instruction including the transmission start time so that the subscriber apparatus transmits an upstream signal indicating completion of the wavelength switching of the subscriber apparatus at a wavelength after switching, after passage of a scheduled time of the wavelength switching of the subscriber apparatus;

a switching completion transmission procedure in which the subscriber apparatus transmits the upstream signal indicating the completion of the wavelength switching at the wavelength after the switching at the instructed transmission start time; and a transmission start time correction procedure in which the station-side subscriber accommodation apparatus measures a reception time of the upstream signal indicating the completion of the wavelength switching received after the wavelength switching and sets a time obtained by adding a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

In the present invention, the station-side subscriber accommodation apparatus performs setting of a receivable period of the upstream signal indicating the completion of the wavelength switching received after the wavelength switching to a period wider than a receivable period of the upstream signal indicating the completion of the wavelength switching assumed before the wavelength switching.

In the present invention, the station-side subscriber accommodation apparatus continues setting of the new transmission start time in the transmission start time correction procedure until an upstream signal propagation delay time is measured at the wavelength after the switching.

Specifically, the present invention is a WDM/TDM-PON system in which a station-side subscriber accommodation apparatus and a plurality of subscriber apparatuses are connected by PON topology and a subscriber apparatus switches a transmission wavelength, a transmission start time, and transmission duration in accordance with an instruction from the station-side subscriber accommodation apparatus, wherein the station-side subscriber accommodation apparatus issues an instruction using a downstream signal for instructing the subscriber apparatus to perform wavelength switching, the downstream signal including the transmission start time of an upstream signal indicating completion of the wavelength switching of the subscriber apparatus, the upstream signal being transmitted by the subscriber apparatus after the wavelength switching, the subscriber apparatus transmits the upstream signal indicating the completion of the wavelength switching at a wavelength after switching at the instructed transmission start time after the wavelength switching is completed in accordance with the instruction, and the station-side subscriber accommodation apparatus measures a reception time of the upstream signal indicating the completion of the wavelength switching received after the wavelength switching and sets a time obtained by adding a time twice a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

Specifically, the present invention is a WDM/TDM-PON system in which a station-side subscriber accommodation apparatus and a plurality of subscriber apparatuses are connected by PON topology and a subscriber apparatus switches a transmission wavelength, a transmission start time, and transmission duration in accordance with an instruction from the station-side subscriber accommodation apparatus, wherein the station-side subscriber accommodation apparatus instructs the subscriber apparatus to perform wavelength switching and the subscriber apparatus performs the wavelength switching in accordance with the instruction, the station-side subscriber accommodation apparatus issues an instruction including the transmission start time so that the subscriber apparatus transmits an upstream signal indicating completion of the wavelength switching of the subscriber apparatus at a wavelength after switching, after passage of a scheduled time of the wavelength switching of the subscriber apparatus, the subscriber apparatus transmits the upstream signal indicating the completion of the wavelength switching at the wavelength after the switching at the instructed transmission start time, and the station-side subscriber accommodation apparatus measures a reception time of the upstream signal indicating the completion of the wavelength switching received after the wavelength switching and sets a time obtained by adding a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

In the present invention,
the station-side subscriber accommodation apparatus performs setting of a receivable period of the upstream signal indicating the completion of the wavelength switching received after the wavelength switching to a period wider than a receivable period of the upstream signal indicating the completion of the wavelength switching assumed before the wavelength switching.

In the present invention,
the station-side subscriber accommodation apparatus continues setting of the new transmission start time until an upstream signal propagation delay time is measured at the wavelength after the switching.

Also, the above-described aspects of the present invention can be combined where possible.

Advantageous Effects of the Invention

In accordance with the present invention, it is possible to avoid the collision of upstream signals in a station-side subscriber accommodation apparatus after wavelength switching.

MODES FOR CARRYING OUT THE INVENTION

Figure 1:
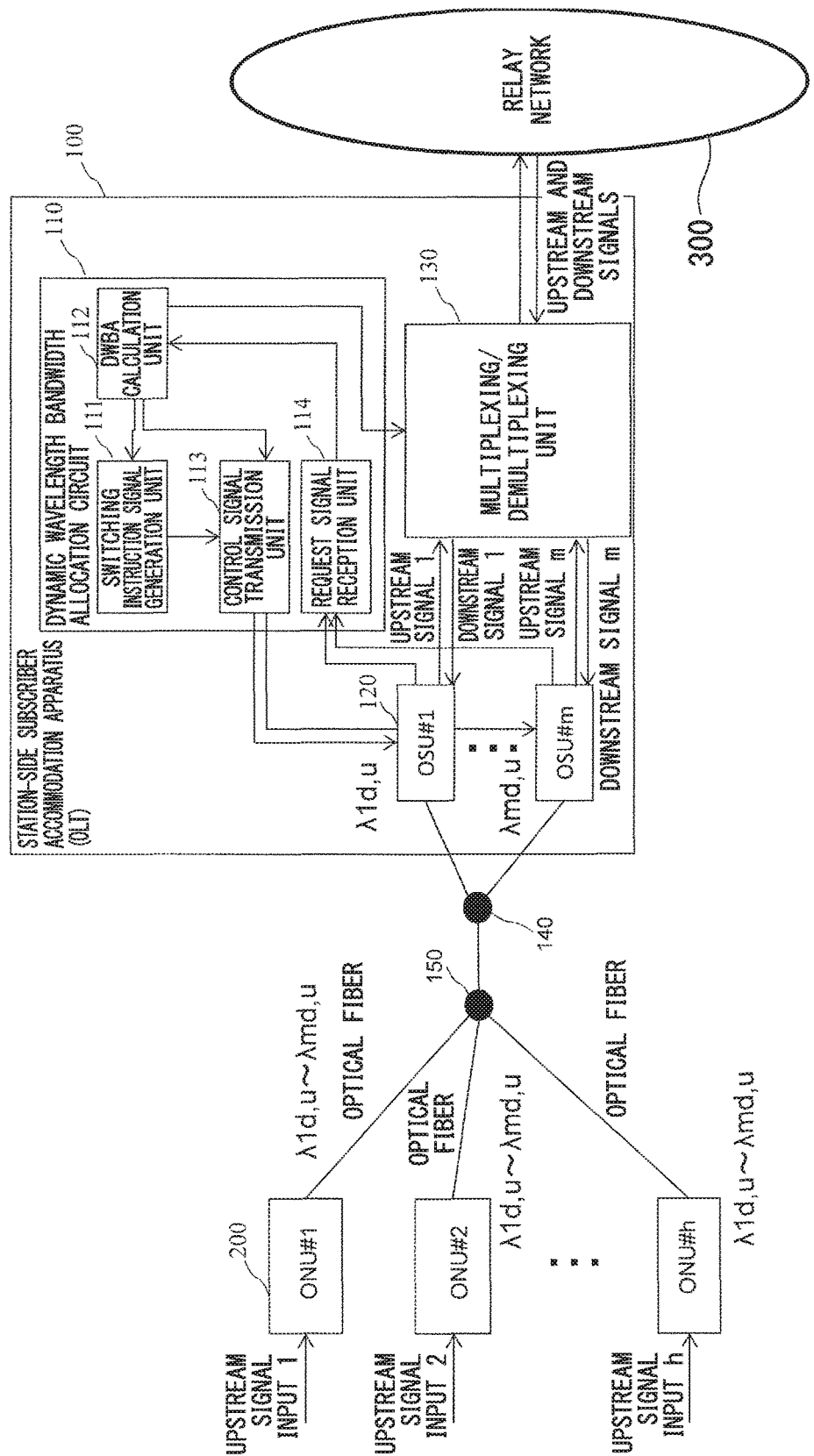
FIG. 1 is a diagram describing a configuration of a wavelength-tunable WDM/TDM-PON system in an embodiment of the present invention.

Hereinafter, embodiments of the present invention will be described in detail with reference to the drawings. It is to be noted that the present invention is not limited to the following embodiments. These embodiments are merely examples of the present invention, and the present invention can be implemented with modification and/or improvement in various ways based on the knowledge of those skilled in the art. It is to be noted that the same components are assigned the same reference signs in the present description and the drawings.

Embodiment 1

In a WDM/TDM-PON system of the present embodiment 1, an OLT and a plurality of ONUs are connected by PON topology and an ONU switches transmission and reception wavelength, a transmission start time, and transmission duration in accordance with an instruction from the OLT. The WDM/TDM-PON system executes the following procedure. In a completion instruction procedure, the OLT issues an instruction by including a transmission start time of an upstream signal indicating completion of wavelength switching of the ONU in a downstream signal for instructing the ONU to perform the wavelength switching, wherein the upstream signal is transmitted by the ONU after the wavelength switching. In an instruction completion transmission procedure, the ONU transmits the upstream signal indicating the completion of the wavelength switching at a wavelength after switching at the instructed transmission start time after the wavelength switching is completed in accordance with the instruction. In a transmission start time correction procedure, the OLT measures a reception time of the upstream signal indicating the completion of the wavelength switching received after the wavelength switching and sets a time obtained by adding a time twice a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

Embodiment 1-1

Specifically, the WDM/TDM-PON system executes the following procedure. In order to receive a report (complete) frame after wavelength switching, a period in which a frame can be received allocated to the ONU is set to be wider than that of related art 1 so that the report frame can be received even when the report frame arrives earlier or later within the range of a given fixed time considering an influence due to a change of the length of an optical fiber path after the wavelength switching and dispersion. At the time of reception of the report frame, the difference between the reception time of the report frame and a reception time assumed at a wavelength before the wavelength switching is measured. Thereafter, until a one-way propagation delay time or a round-trip propagation delay time after the wavelength switching of the ONU is measured again, a time obtained by adding a time twice an arrival time difference measured in the reception of the report (complete) frame after the wavelength switching to a time calculated before the wavelength switching is instructed as an upstream frame transmission start time of the ONU designated by a gate frame.

Figure 2:
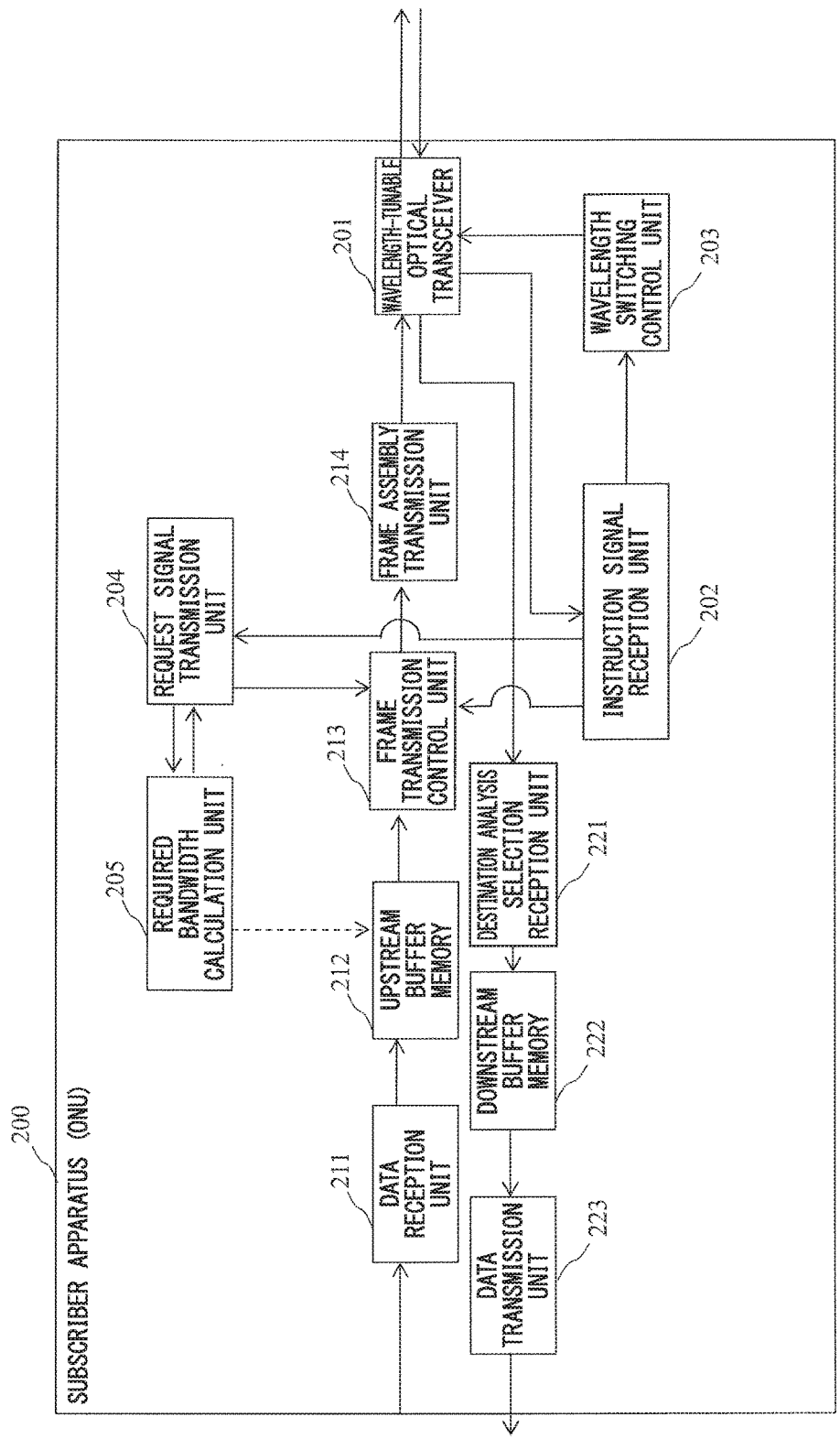
FIG. 2 is a diagram describing a configuration of an ONU in the wavelength-tunable WDM/TDM-PON system in an embodiment of the present invention.
Figure 3:
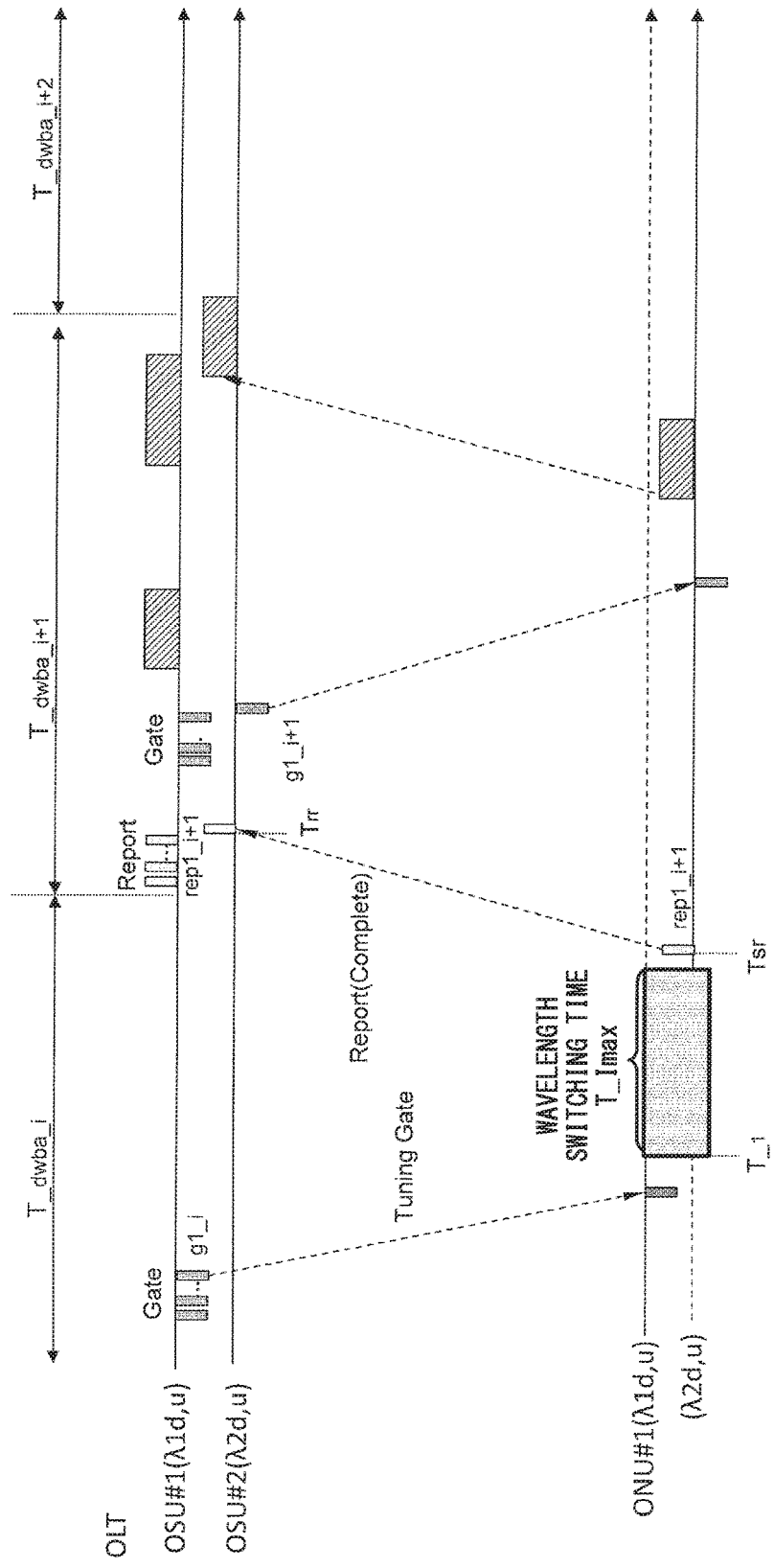
FIG. 3 is an example of designation of an upstream transmission timing of the ONU in the wavelength-tunable WDM/TDM-PON system using an EPON scheme.

A configuration of the WDM/TDM-PON system of the present embodiment will be described. The configuration of the WDM/TDM-PON system of the present embodiment is similar to those of FIGS. 1 and 2. Also, in a wavelength switching procedure, as in FIG. 3, a gate frame (a tuning gate frame) g1_$i$ for instructing wavelength switching is transmitted from OSU #1 to ONU #1. Information of a wavelength switching start time T_1 and switching destination wavelengths, i.e., λ2$d,u$, a transmission time Tsr of a report (complete) frame rep1_$i$+1 which is a switching completion frame to be transmitted to OSU #2 after wavelength switching, and transmission duration are written in g1_$i$. ONU #1 starts wavelength switching from T_1. When the maximum time required for the wavelength switching is denoted as T_lmax, ONU#1 completes switching to λ2$d,u$ after the passage of T_lmax from T_1. Thereafter, the report (complete) frame rep1_$i$+1 transmitted at the time Tsr of ONU #1 at a wavelength λ2_2$u$ is received by OSU #2 at a time Trr of the OLT 100 and OSU #2 recognizes the completion of the wavelength switching of ONU #1 upon receipt of the report (complete) frame. Bandwidth request information of ONU #1 may be written in the report (complete) frame and OSU #2 may perform bandwidth allocation calculation of an upstream signal in a (T_dwba_$i$+1) cycle using the bandwidth request information.

Figure 8:
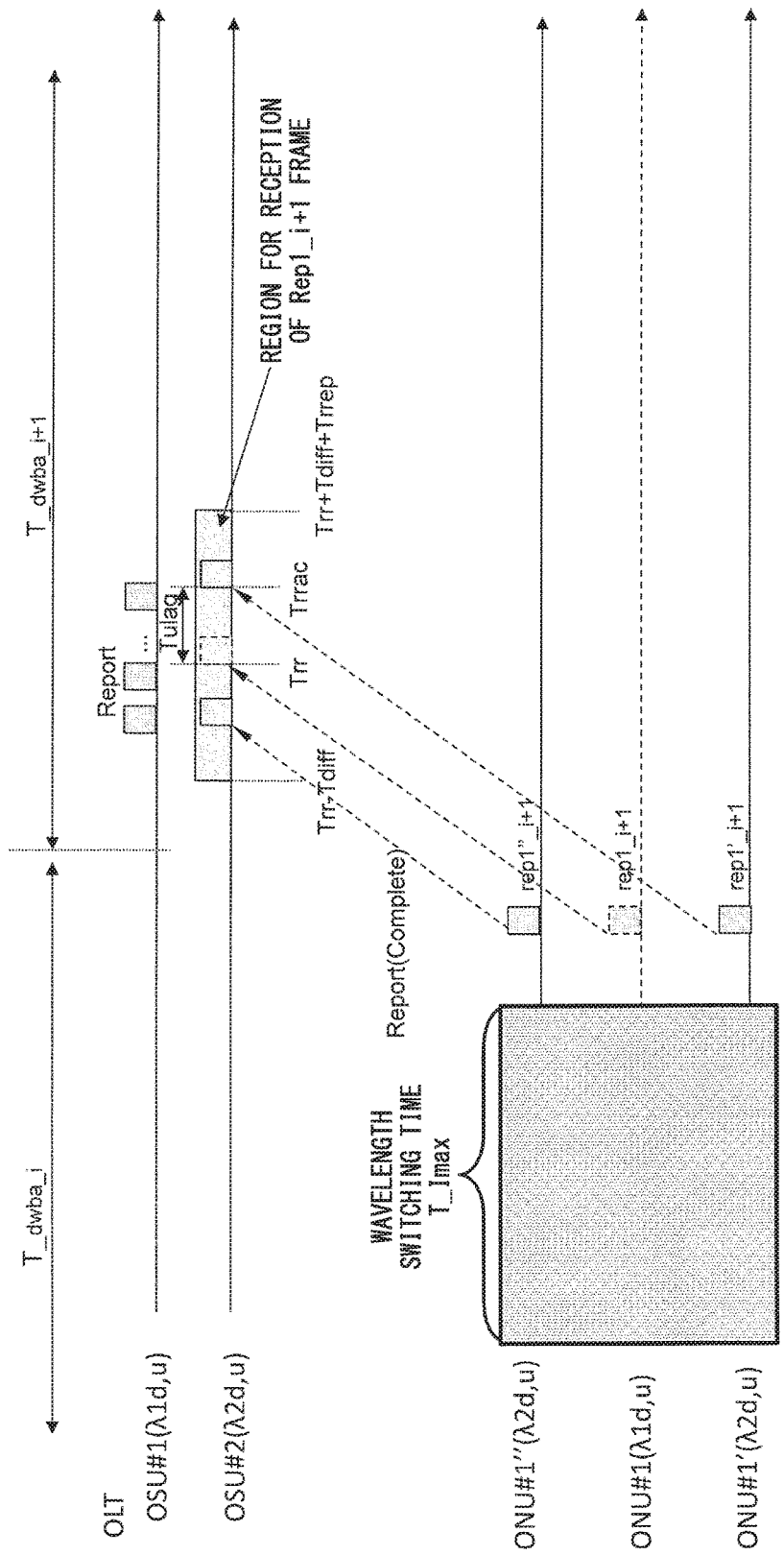
FIG. 8 is a diagram describing an upstream frame arrival time correction method in an embodiment of the present invention.
Figure 9:
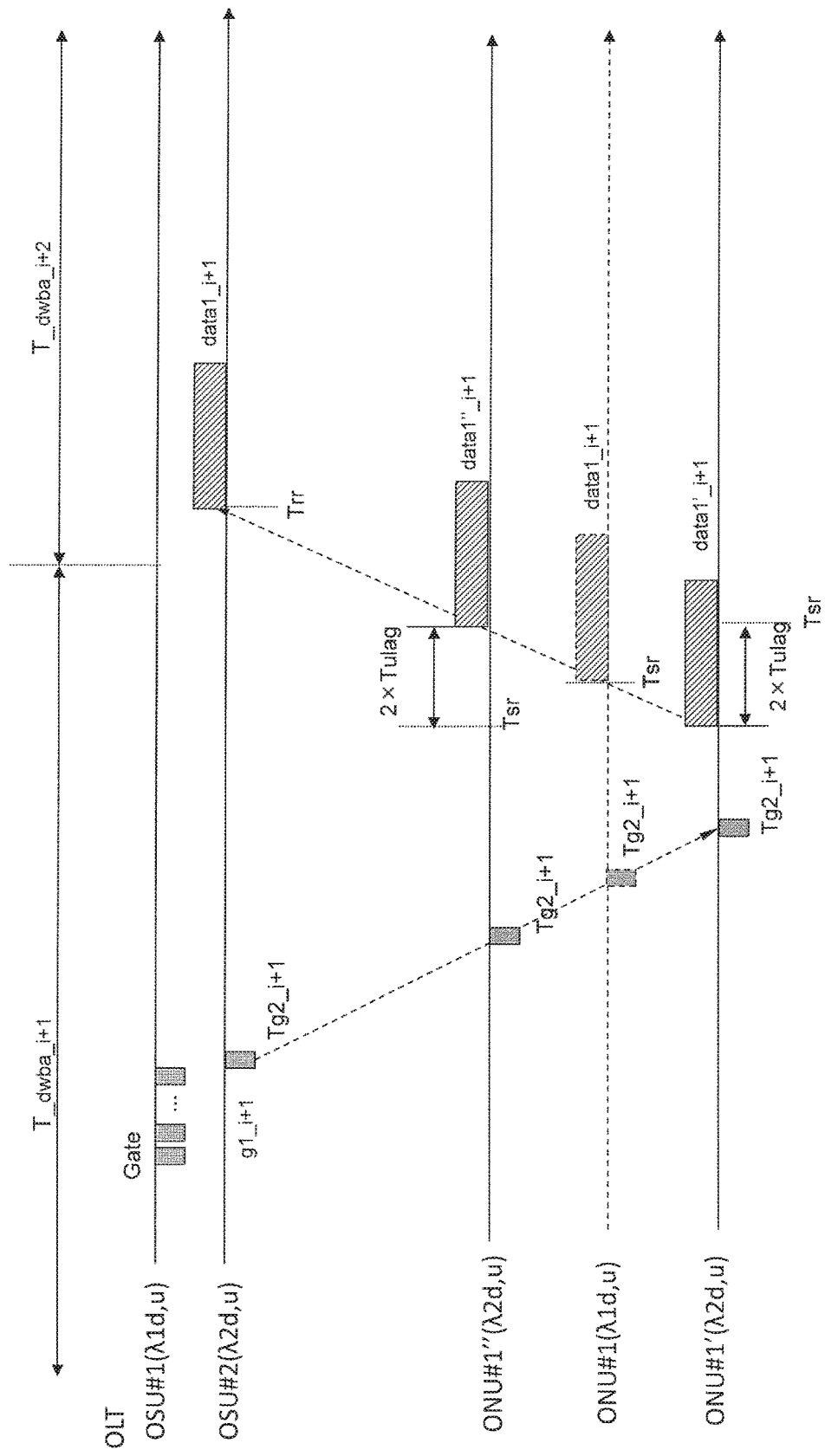
FIG. 9 is a diagram describing an upstream frame arrival time correction method in an embodiment of the present invention.

Next, an operation of the WDM/TDM-PON system of the present embodiment will be described. FIGS. 8 and 9 show an upstream frame arrival time correction method in the present embodiment. FIG. 8 shows a method for acquiring a correction time difference and FIG. 9 shows a method for actually performing correction using the acquired correction time difference.

In FIG. 8, first, OSU #2 secures a time for receiving a report (complete) frame indicating completion of the wavelength switching after completion of the wavelength switching so that the report (complete) frame can be received even when the report (complete) frame arrives earlier or later by a time less than or equal to a maximum arrival time difference Tdiff generated by a fiber distance difference and/or dispersion, rather than the arrival time and the duration of rep1_$i$+1 of related arts. Therefore, when the duration necessary to receive the report (complete) frame is denoted as Trrep, a period from the time Trr to a time (Trr+Trrep) of the OLT 100 is secured as the time for receiving (rep1_$i$+1) frame of ONU #1 in the related arts, but a period from a time (Trr−Tdiff) to a time (Trr+Tdiff+Trrep) is set as a time for receiving a report (complete) frame of ONU #1 in the present embodiment.

Next, OSU #2 measures a time Trrac at which the report (complete) frame actually arrives from ONU #1 and calculates a difference Tulag from the time Trr at which the report (complete) frame arrives from ONU #1 before the wavelength switching.

That is, $Tulag = Trr - Trrac$ (1).

Figure 4:
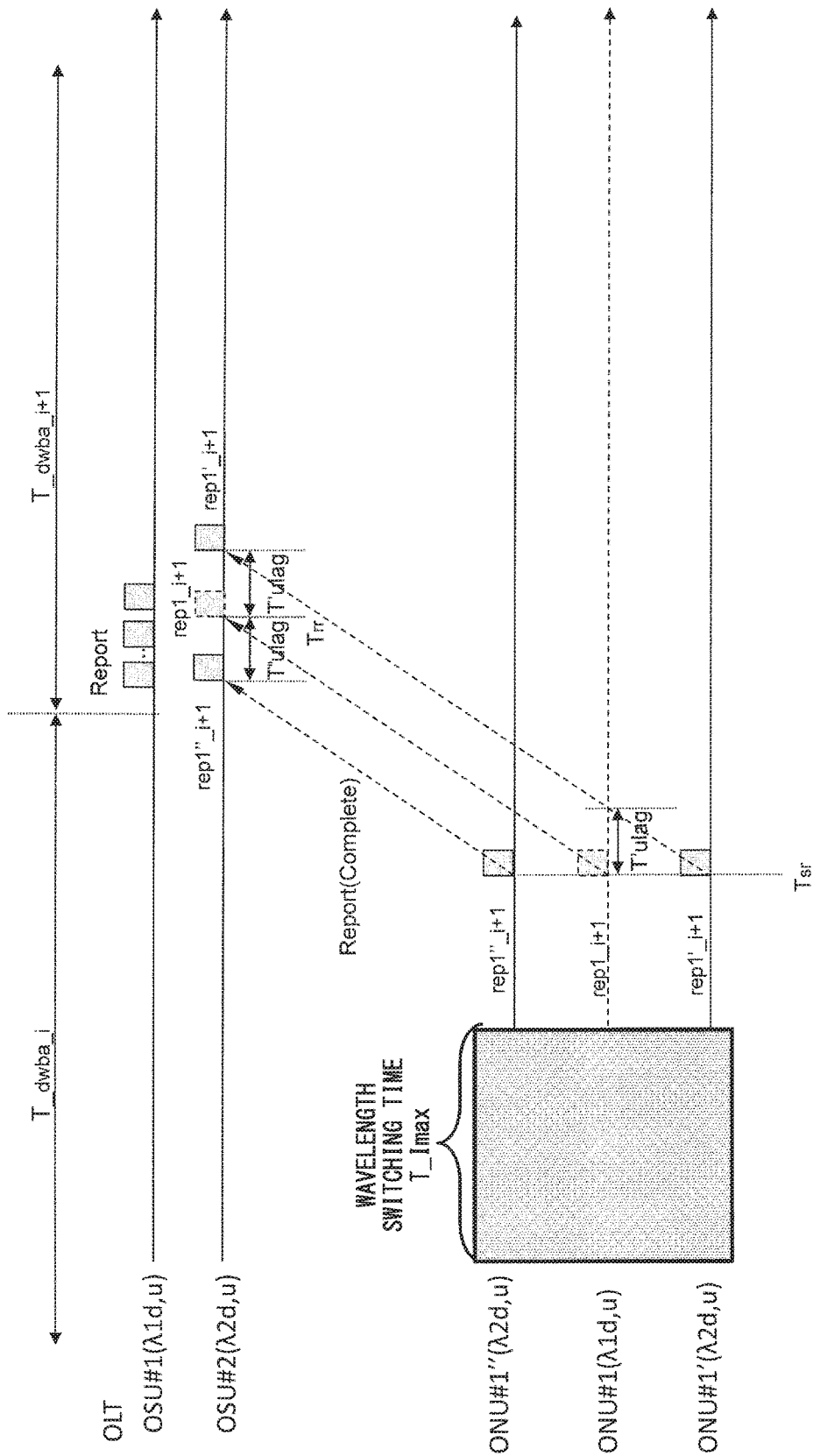
FIG. 4 is a diagram describing a problem of an upstream report (complete) frame transmission timing of the ONU in the wavelength-tunable WDM/TDM-PON system using the EPON scheme.

As shown in FIG. 4, Tulag is equal to T"ulag for ONU #1" which is virtually close due to wavelength switching and has a positive value. Also, Tulag is equal to T'ulag for ONU #1' which is virtually far due to wavelength switching and has a negative value.

Figure 5:
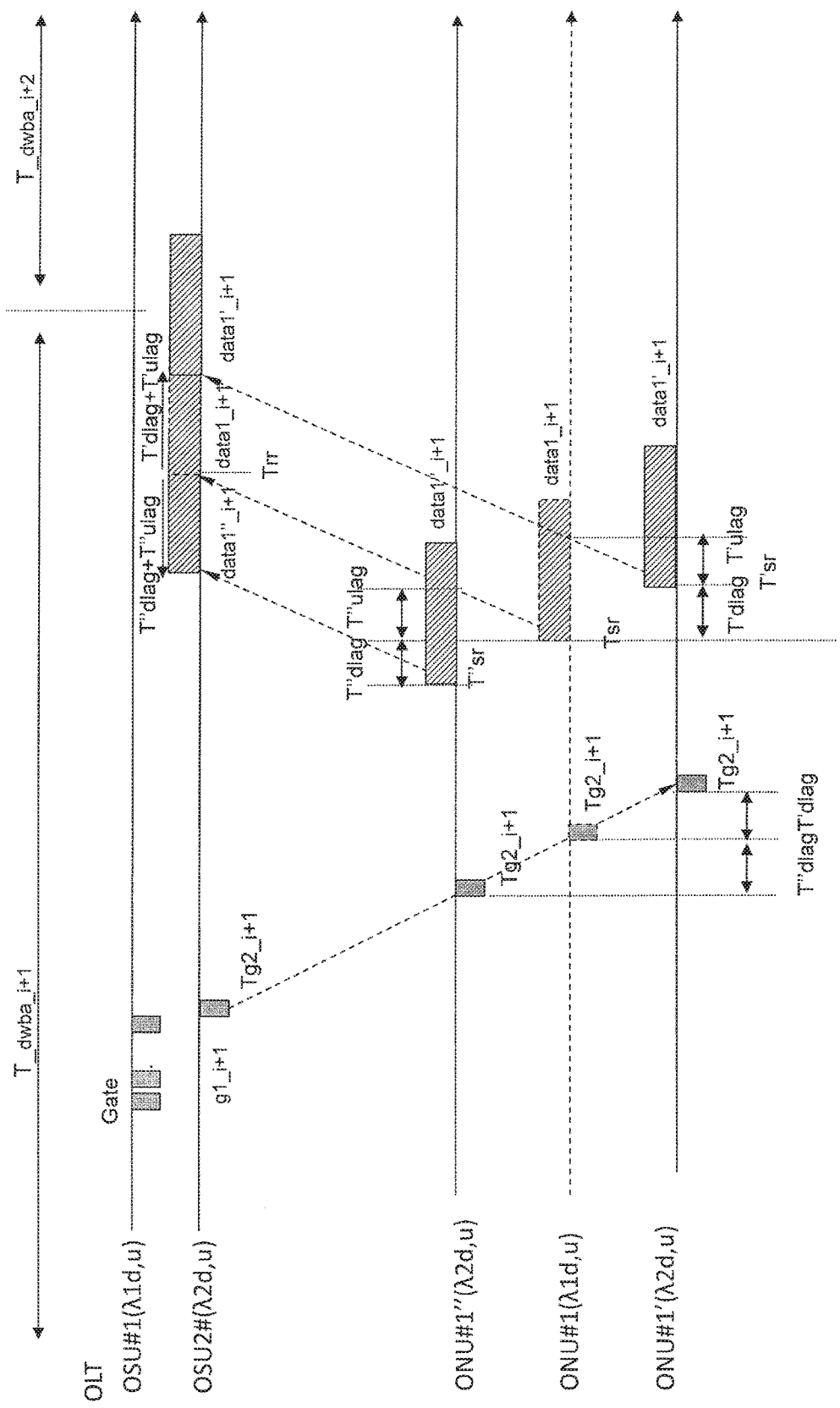
FIG. 5 is a diagram describing a problem of an upstream frame transmission timing of the ONU in the wavelength-tunable WDM/TDM-PON system using the EPON scheme.

Next, a method for correcting a transmission start time of ONU #1 in the present embodiment will be described using FIG. 9. As shown in FIG. 5 of the related art 1, in order to cause the upstream data frame to arrive at the time Trr of OSU #2, it is only necessary to set the transmission start time of ONU #1 obtained by correcting an arrival time difference generated by a fiber path change and/or fiber dispersion. An upstream frame propagation delay difference of ONU #1 is measured as Tulag at the time of reception of the report (complete) frame as described in FIG. 8.

Also, the time of ONU #1 is synchronized with Tg2_$i$+1, which is the local time described in a gate frame g1_$i$+1, after the wavelength switching, so that time deviation of T'dlag or T"dlag occurs. That is, it can be seen that it is only necessary to set a transmission start time instructed by g1_$i$+1 as (Tsr+T"dlag+T"ulag) in ONU #1" and to set a transmission start time instructed by g1_$i$+1 as (Tsr+T'dlag+T'ulag) in ONU #1'.

Furthermore, as the time at which ONU #1 after the wavelength switching starts transmission of an upstream frame, a value obtained by correcting the transmission start time Tsr calculated in ONU #1 before the wavelength switching using the value of Tulag measured in the reception of the report (complete) frame to $$Tsr + 2 \times Tulag \qquad (2)$$

is written in the gate frame. The reason is that the time difference Tulag from the arrival time from an originally assumed position of ONU #1 is measured in the reception of the report (complete) frame of FIG. 8, but T'dlag and T"dlag cannot be directly used because T'dlag and T"dlag are not measured. However, normally, in the case in which the OLT 100 and the ONUs 200 are arranged, it is considered that the distances between the OLT 100 and the ONUs 200 are about several tens of kilometers, and thus T'dlag is substantially equal to T'ulag and T"dlag is substantially equal to T"ulag for one certain OSU 120 assuming that a time difference due to fiber dispersion is small enough to ignore.

Therefore, a propagation time difference after the wavelength switching is absorbed using the correction of Formula (2) which uses Tulag. FIG. 9 shows a situation in which upstream data frames data1"_$i$+1 and data1_$i$+1, which have been transmitted from the ONU 200 of a state in which the arrival time difference occurs as in ONU #1" and ONU #1' due to a time described in the gate frame g1_$i$+1, arrive at the time Trr assumed by OSU #2.

Embodiment 1-2

Figure 7:
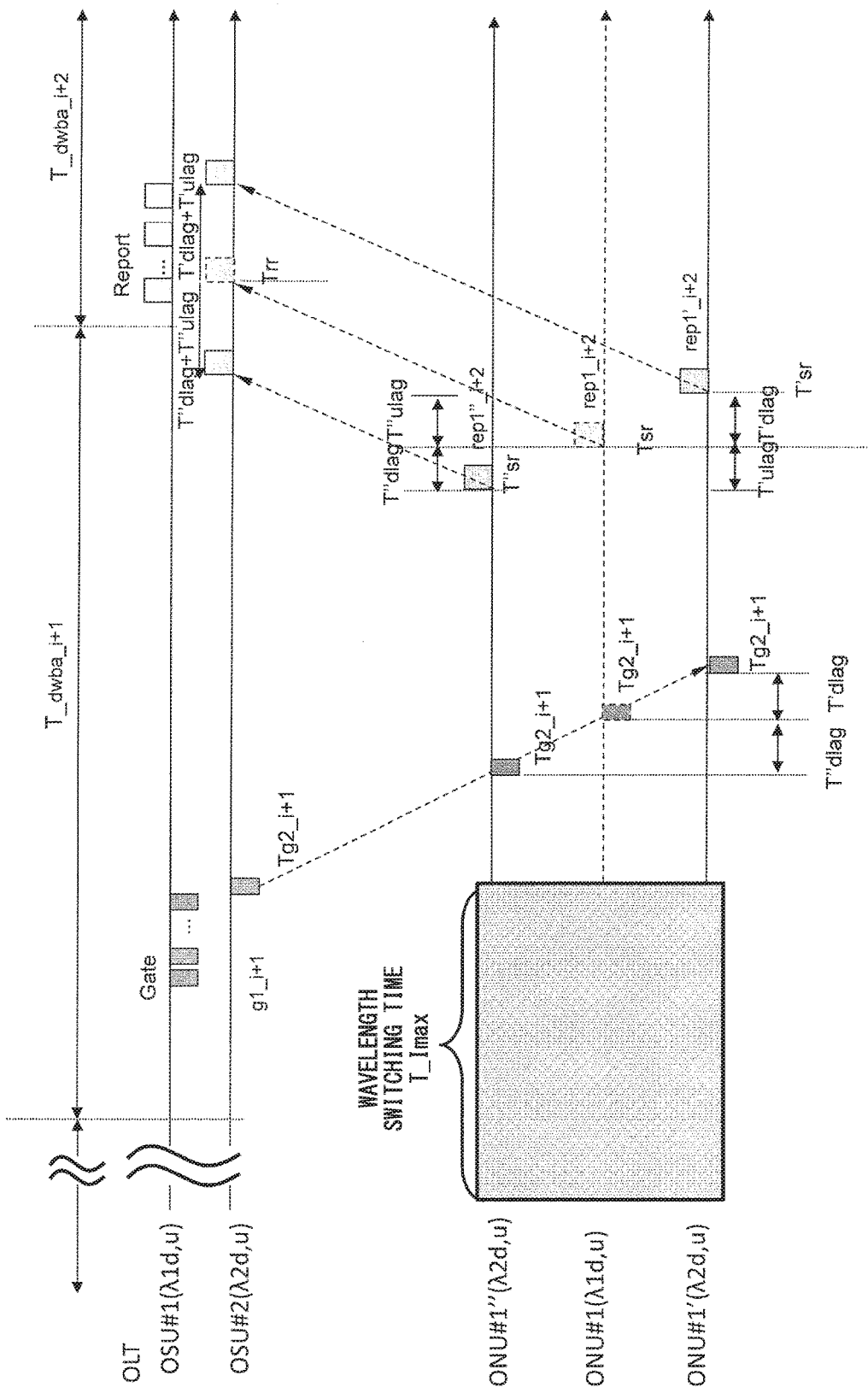
FIG. 7 is a diagram describing a problem of an upstream frame transmission timing of the ONU in Non-Patent Document 5.

In the present embodiment, it is only necessary to correct the upstream frame transmission start time of ONU #1 until a difference of Tulag is eliminated. Non-Patent Document 4 describes a method for measuring a propagation delay time between the OSU 120 and the ONU 200 at the time of a discovery process which is an initial connection procedure, Trr can be calculated based on a wavelength after switching by executing the measurement after performing the wavelength switching, and thus correction using Tulag is unnecessary at that time. Also, an error of the time of the ONU 200, such as T'sr and T"sr which are present in FIG. 7, is solved by the measurement of the propagation delay time and time synchronization of the ONU 200 is restored.

Effects of Embodiment 1

Because it is possible to correct the arrival time difference due to the fiber distance difference and/or the fiber dispersion generated before and after wavelength switching up to ±Tdiff in the present embodiment, it is possible to prevent an upstream frame arriving at the OSU 120 after wavelength switching from colliding with another upstream frame arriving almost simultaneously and to perform normal upstream burst communication.

Also, the collision of upstream frames can also be avoided by always causing the upstream frame allocation time of the ONU 200 to have a blank section of a time width having a larger change than (T'dlag+T'ulag) or (T"dlag+T"ulag) before and after the expected frame arrival time so as to allow the arrival time difference before and after the wavelength switching. However, in this case, the average interval between upstream frames is widened and upstream data transfer efficiency is decreased. In accordance with the present embodiment, it is possible to improve upstream transmission efficiency because the above-described blank section is unnecessary when measurement precision of an arrival time difference of an upstream report (complete) frame measured in the present embodiment and time synchronization precision by the gate frame are sufficiently high.

Further, in accordance with the present embodiment, it is possible to correct the arrival time difference of the upstream frame due to the optical fiber distance difference between the OSUs 120 and the fiber dispersion as long as the arrival time difference is less than or equal to ±Tdiff. Therefore, it is possible to configure a wavelength-tunable WDM/TDM-PON system in which an optical fiber distance difference between the OSUs 120 and fiber dispersion can be allowed.

It is to be noted that, in the present embodiment, an error of time synchronization in ONU #1, for example, a state in which T'sr or T"sr occurs as shown in FIG. 7, cannot be eliminated. That is, from the viewpoint of time synchronization of the ONU 200, an operation is performed in a state in which the error occurs. Therefore, it is possible to eliminate the error of the time synchronization of the ONU 200 at an early stage and return to normal synchronization and upstream frame transmission time control by measuring, after correction of the present embodiment, a propagation delay time at a wavelength after switching and stopping the correction.

Embodiment 2

In a WDM/TDM-PON system of the present embodiment 2, an OLT 100 and a plurality of ONUs 200 are connected by PON topology, and an ONU 200 switches transmission and reception wavelengths, a transmission start time, and transmission duration in accordance with an instruction from the OLT 100. The WDM/TDM-PON system executes the following procedure. In a wavelength switching procedure, the OLT 100 instructs the ONU 200 to perform wavelength switching and the ONU 200 performs the wavelength switching in accordance with the instruction. In a transmission instruction procedure, after the passage of a scheduled time for the wavelength switching of the ONU 200, the OLT 100 issues an instruction including a transmission start time so that the ONU 200 transmits an upstream signal indicating completion of the wavelength switching of the ONU 200 at a wavelength after switching. In a switching completion transmission procedure, the ONU 200 transmits the upstream signal indicating the completion of the wavelength switching at the wavelength after the switching at the instructed transmission start time. In a transmission start time correction procedure, the OLT 100 measures a reception time of the upstream signal indicating the completion of the wavelength switching received after the wavelength switching and sets a time obtained by adding a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

Embodiment 2-1

Specifically, the WDM/TDM-PON system executes the following procedure. In order to receive a report (complete) frame after wavelength switching, a period in which a frame can be received allocated to the ONU 200 is set to be wide so that the report frame can be received even when the report frame arrives earlier or later within the range of a given fixed time considering an influence of a change in the length of an optical fiber path after the wavelength switching and dispersion. At the time of reception of the report frame, a time difference between the reception time of the report frame and a reception time assumed at a wavelength before the wavelength switching is measured. Thereafter, until the one-way propagation delay time or the round-trip propagation delay time after the wavelength switching of the ONU 200 is measured again, a time obtained by adding an arrival time difference measured in the reception of the report (complete) frame after the wavelength switching to a time calculated before the wavelength switching is instructed as an upstream frame transmission start time of the ONU 200 designated by a gate frame.

A configuration of the WDM/TDM-PON system of the present embodiment will be described. The configuration of the WDM/TDM-PON system of the present embodiment is similar to those of FIGS. 1 and 2. Also, in a wavelength switching procedure, as in FIG. 6, a gate frame (a tuning gate frame) g1_$i$−1 for instructing wavelength switching is transmitted from OSU #1 to ONU #1. Information of a wavelength switching start time T_1 and switching destination wavelengths, i.e., λ2$d,u$ is written in g1_$i$−1. ONU #1 starts the wavelength switching from T_1. When the maximum time required for the wavelength switching is denoted as T_lmax, ONU #1 completes switching to λ2$d,u$ after the passage of T_lmax from T_1.

Next, OSU #2 to which ONU #1 belongs after the wavelength switching transmits a gate frame g1_$i$+1 to the destination ONU #1 at the wavelength λ2$d$ in order to confirm completion of the wavelength switching of ONU #1. A transmission start time Tsr and transmission duration of the report (complete) frame indicating that ONU #1 has completed the wavelength switching are written in g1_$i$+1. Thereafter, the report (complete) frame rep1_$i$+2 transmitted at the time Tsr of ONU #1 at the wavelength λ2$u$ is received by OSU #2 at a time Trr of the OLT 100, and OSU #2 recognizes the completion of the wavelength switching of ONU #1 upon receipt of the report (complete) frame. Bandwidth request information of ONU #1 may be written in the report (complete) frame and OSU #2 may perform bandwidth allocation calculation of the upstream signal in a (T_dwba_$i$+2) cycle using the bandwidth request information.

Figure 10:
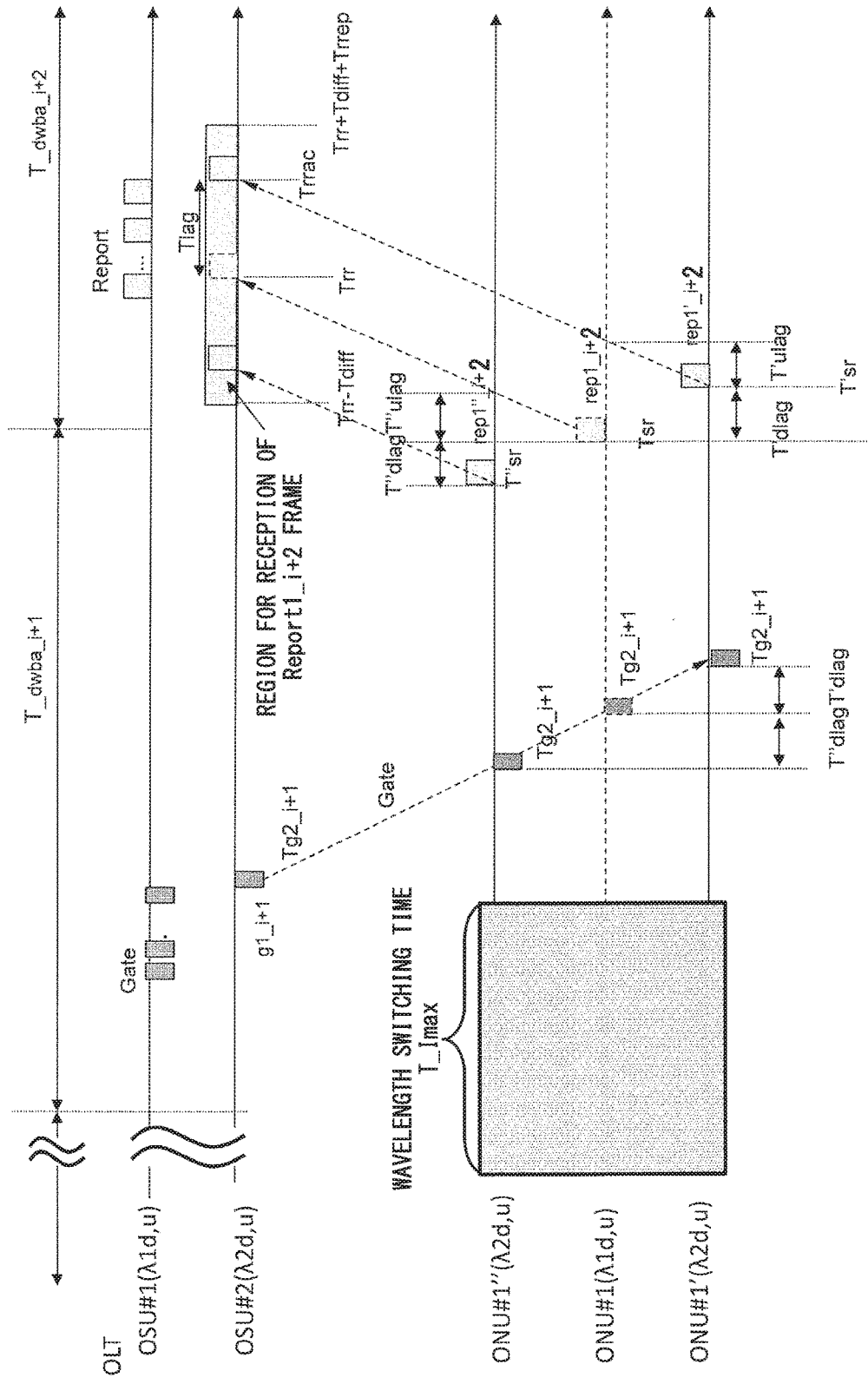
FIG. 10 is a diagram describing an upstream frame arrival time correction method in an embodiment of the present invention.
Figure 11:
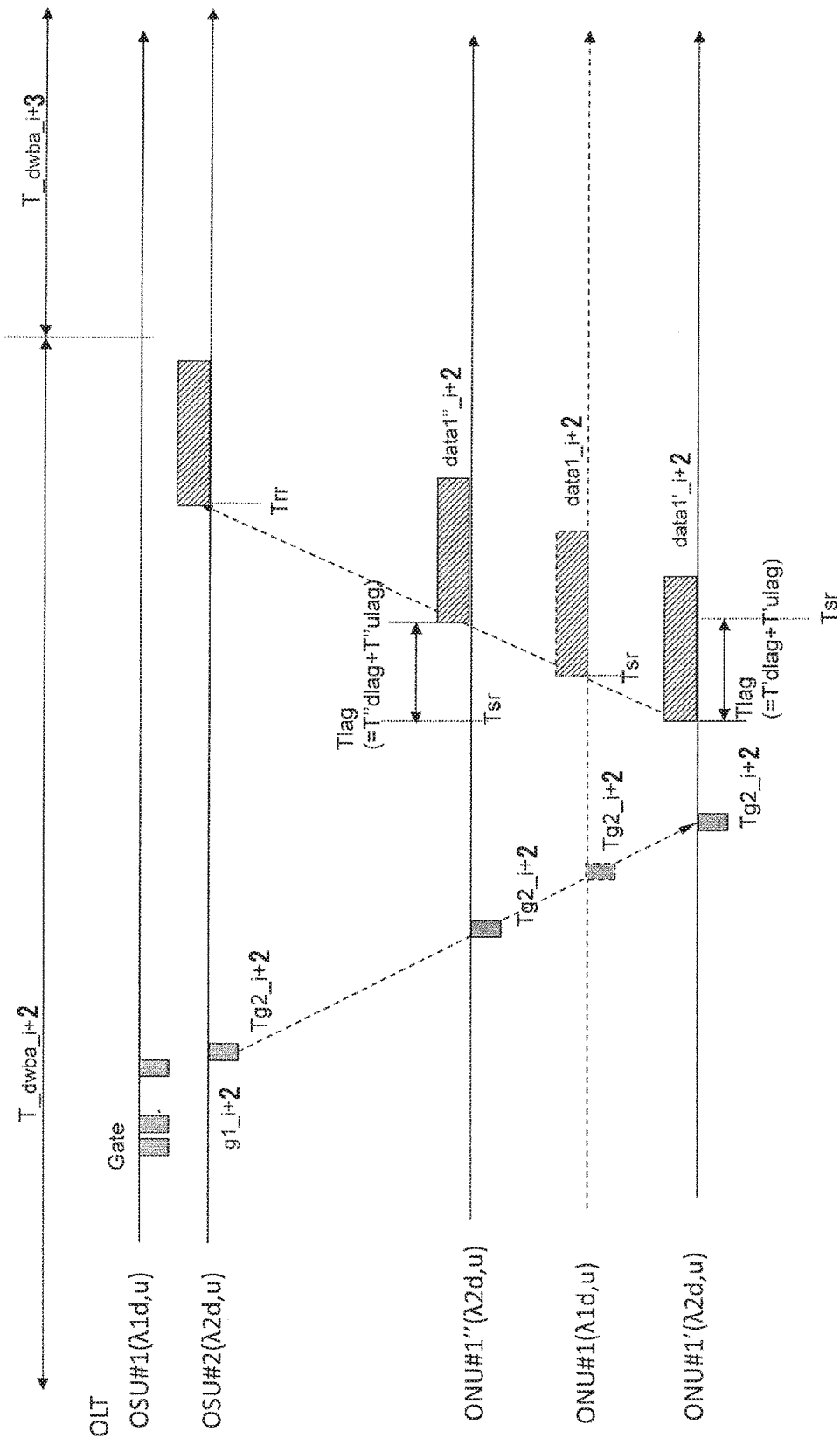
FIG. 11 is a diagram describing an upstream frame arrival time correction method in an embodiment of the present invention.
Figure 12:
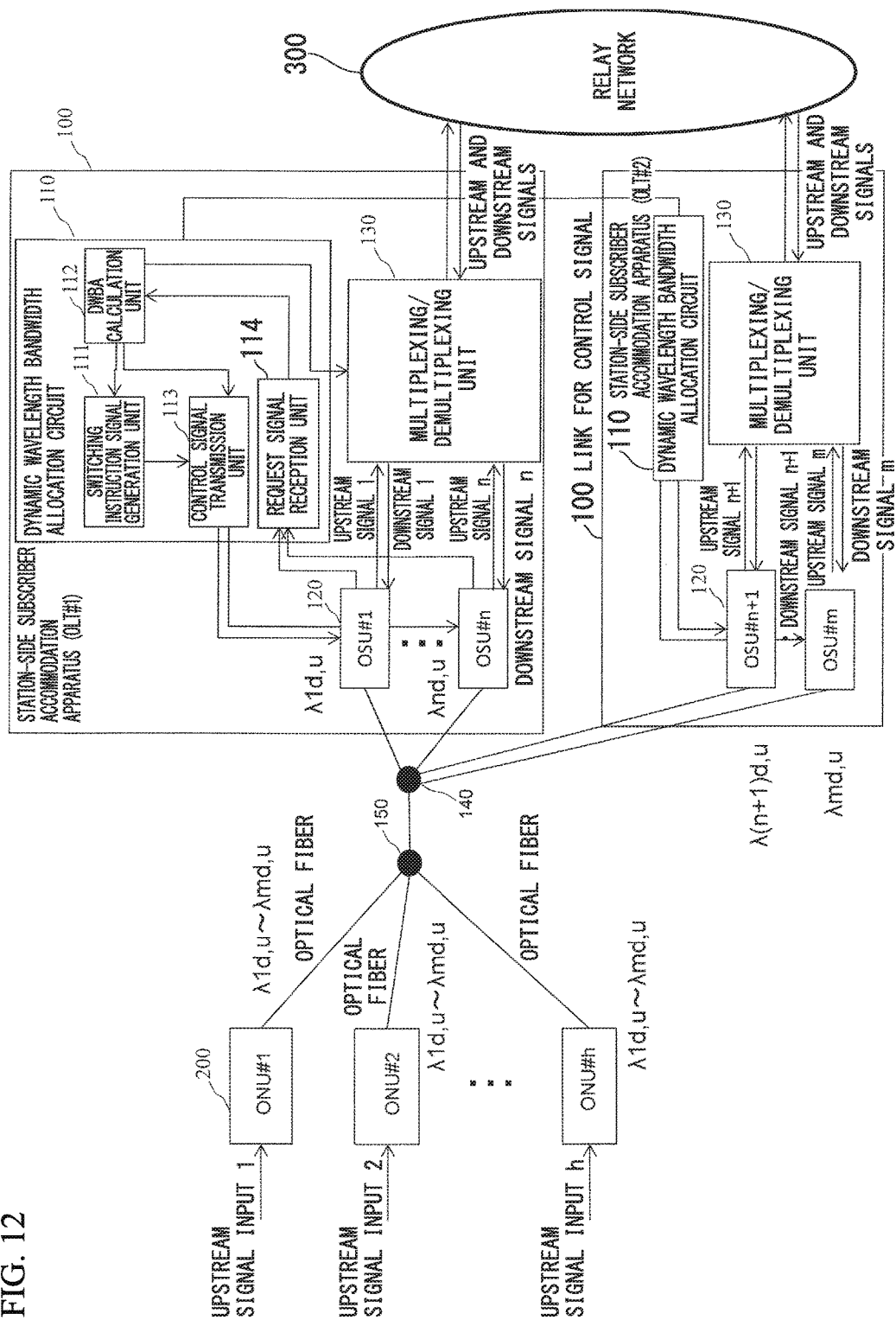
FIG. 12 is a diagram describing a configuration of a wavelength-tunable WDM/TDM-PON system in an embodiment of the present invention.

FIG. 10 shows an upstream frame arrival time correction method in the present embodiment, i.e., a method for acquiring a correction time difference. FIG. 11 shows an actual correcting method using the acquired correction time difference.

In FIG. 10, first, OSU #2 secures a time for receiving the report (complete) frame indicating completion of the wavelength switching after completion of the wavelength switching so that the report (complete) frame can be received even when the report (complete) frame arrives earlier or later by a time less than or equal to a maximum arrival time difference Tdiff generated by a fiber distance difference and/or dispersion, rather than the arrival time and the duration of rep1_$i$+2 of the related arts. Therefore, when the duration necessary to receive the report (complete) frame is denoted as Trrep, a period from the time Trr to a time (Trr+Trrep) of the OLT 100 is secured for receiving the report (complete) frame of ONU #1 in the related arts, but a period from a time (Trr−Tdiff) to a time (Trr+Tdiff+Trrep) is set as a time for receiving a report (complete) frame of ONU #1 in the present embodiment.

Next, OSU #2 measures a time Trrac at which a report (complete) frame actually arrives from ONU #1 and calculates a difference Tlag from the time Trr at which the report (complete) frame arrives from ONU #1 before the wavelength switching. That is, $$Tlag=Trr-Trrac \quad (3).$$

As shown in FIG. 5, Tlag is equal to (T″ulag+T″dlag) for ONU #1″ which is virtually close due to the wavelength switching and has a positive value. Also, Tlag is equal to (T′ulag+T′dlag) for ONU #1′ which is virtually far due to the wavelength switching and has a negative value.

Figure 6:
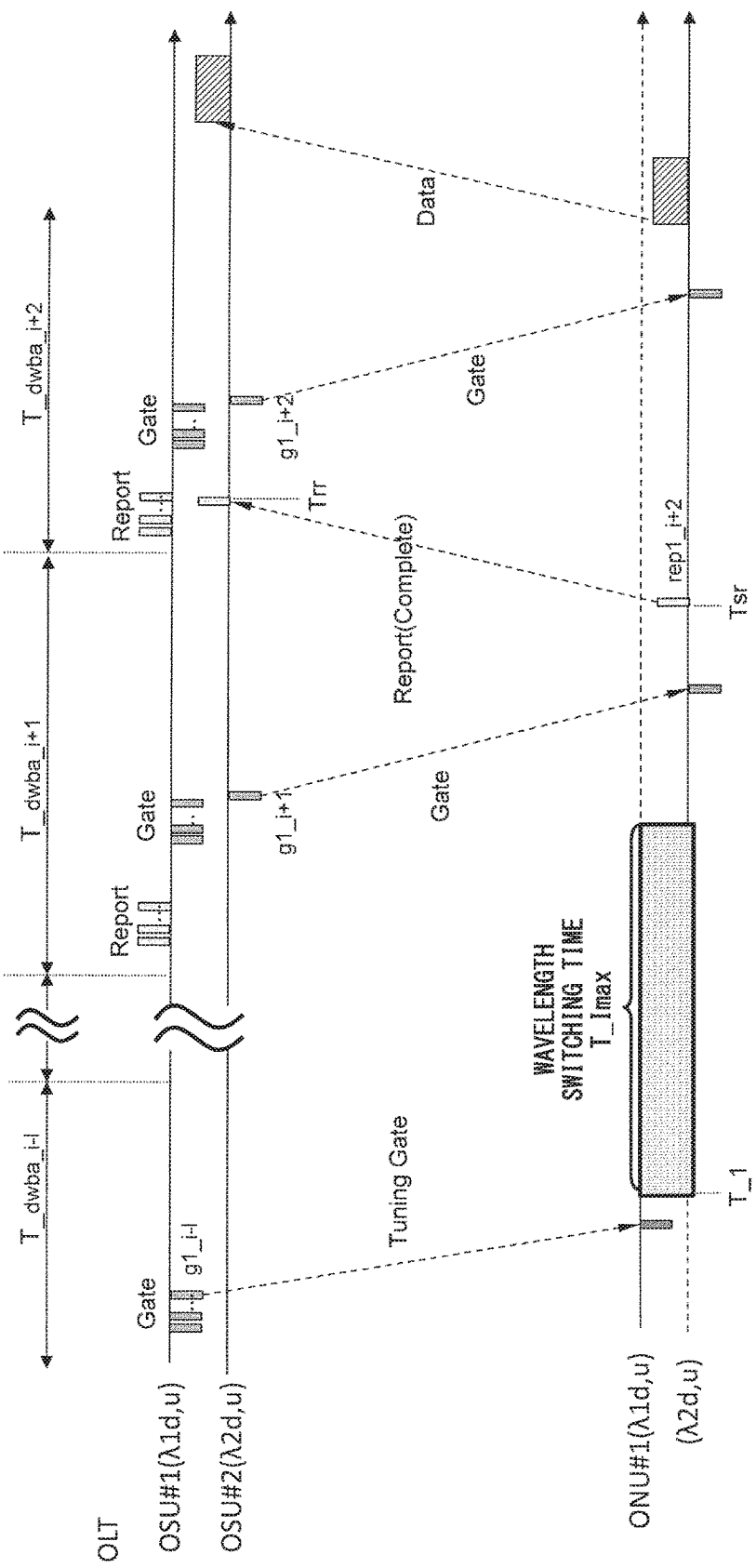
FIG. 6 is a diagram describing an example of designation of an upstream transmission timing of the ONU in Non-Patent Document 5.

Next, a method for correcting a transmission start time of ONU #1 in the present embodiment will be described using FIG. 11. As shown in FIG. 6 of related art 2, in order to cause the upstream data frame to arrive at the time Trr of OSU #2, it is only necessary to set a transmission start time of ONU #1 by correcting a time difference generated due to a fiber distance difference or fiber dispersion. An upstream frame round-trip propagation delay difference of ONU #1 is measured as Tlag at the time of reception of the report (complete) frame as described in FIG. 10. That is, it can be seen that it is only necessary to set a transmission start time instructed in g1_$i$+2 as (Tsr+Tlag) in ONU #1″ and to set a transmission start time instructed in g1_$i$+2 as (Tsr+Tlag) also in ONU #1′. Accordingly, as the time at which ONU #1 after the wavelength switching starts transmission of an upstream frame, a value obtained by correcting the transmission start time Tsr calculated in ONU #1 before the wavelength switching to $$Tsr+Tlag \quad (4)$$

is written in the gate frame. In this manner, the present embodiment can absorb a propagation time difference after the wavelength switching using the correction of Formula (4) which uses the measured Tlag.

FIG. 11 shows a situation in which upstream data frames data1″_$i$+2 and data1′_$i$+2, which have been transmitted from the ONU 200 of a state in which the arrival time difference occurs as in ONU #1″ and ONU #1′ due to a time described in the gate frame g1_$i$+2, arrive at the time Trr assumed by OSU #2.

Embodiment 2-2

In the present embodiment, it is only necessary to correct the upstream frame transmission start time of ONU #1 until a difference of Tlag is eliminated. Non-Patent Document 4 describes a method for measuring a propagation delay time between the OSU 120 and the ONU 200 at the time of a discovery process which is an initial connection procedure, Trr can be calculated based on a wavelength after switching by executing the measurement after performing the wavelength switching, and thus correction using Tlag is unnecessary at that time. Also, an error of the time of the ONU 200, such as T′sr and T″sr which are present in FIG. 10, is solved by the measurement of the propagation delay time and time synchronization of the ONU 200 is restored.

Effects of Embodiment 2

Because it is possible to correct the arrival time difference due to the fiber distance difference and/or the fiber dispersion generated before and after wavelength switching up to ±Tdiff in the present embodiment, it is possible to prevent an upstream frame arriving at the OSU 120 after wavelength switching from colliding with another upstream frame arriving almost simultaneously and to perform normal upstream burst communication.

Also, the collision of upstream frames can also be avoided by always causing the upstream frame allocation time of the ONU 200 to have a blank section of a time width having a larger change than (T′dlag+T′ulag) or (T″dlag+T″ulag) before and after the expected frame arrival time so as to allow the arrival time difference before and after the wavelength switching. However, in this case, the average interval between upstream frames is widened and upstream data transfer efficiency is decreased. In accordance with the present embodiment, it is possible to improve upstream transmission efficiency because the above-described blank section is unnecessary when measurement precision of an arrival time difference of an upstream report (complete) frame measured in the present embodiment and time synchronization precision by the gate frame are sufficiently high.

Further, in accordance with the present embodiment, it is possible to correct the arrival time difference of the upstream frame due to the optical fiber distance difference between the OSUs 120 and the fiber dispersion as long as the arrival time difference is less than or equal to ±Tdiff. Therefore, it is possible to configure a wavelength-tunable WDM/TDM-PON system in which an optical fiber distance difference between the OSUs 120 and fiber dispersion can be allowed.

It is to be noted that, in the present embodiment, an error of time synchronization in ONU #1, for example, a state in which T′sr or T″sr occurs as shown in FIG. 10, cannot be eliminated. That is, from the viewpoint of time synchronization of the ONU 200, an operation is performed in a state in which the error occurs. Therefore, it is possible to eliminate the error of the time synchronization of the ONU 200 at an early stage and return to normal synchronization and upstream frame transmission time control by measuring, after correction of the present embodiment, a propagation delay time at a wavelength after switching and stopping the correction.

INDUSTRIAL APPLICABILITY

Transmission start time correction technology in accordance with the present invention can be applied to WDM/TDM-PON systems.

DESCRIPTION OF REFERENCE SIGNS

100 Station-side subscriber accommodation apparatus (OLT)
110 Dynamic wavelength bandwidth allocation circuit
111 Switching instruction signal generation unit
112 DWBA calculation unit
113 Control signal transmission unit 114 Request signal reception unit
120 Line card (OSU)
130 Multiplexing/demultiplexing unit
140, 150 Power splitter or wavelength router
200 Subscriber apparatus (ONU)
201 Wavelength-tunable optical transceiver
202 Instruction signal reception unit
203 Wavelength switching control unit
204 Request signal transmission unit
205 Required bandwidth calculation unit
211 Data reception unit
212 Upstream buffer memory
213 Frame transmission control unit
214 Frame assembly transmission unit
221 Destination analysis selection reception unit
222 Downstream buffer memory
223 Data transmission unit
300 Relay network

The invention claimed is:

1. A transmission start time correction method in a WDM/TDM-PON system in which a station-side subscriber accommodation apparatus and a plurality of subscriber apparatuses are connected by PON topology and a subscriber apparatus switches a transmission wavelength, a transmission start time, and transmission duration in accordance with an instruction from the station-side subscriber accommodation apparatus, the transmission start time correction method comprising:

a completion instruction procedure in which the station-side subscriber accommodation apparatus issues an instruction using a downstream signal for instructing the subscriber apparatus to perform wavelength switching, the downstream signal including the transmission start time of an upstream signal indicating completion of the wavelength switching of the subscriber apparatus, the upstream signal being transmitted by the subscriber apparatus after the wavelength switching;

an instruction completion transmission procedure in which the subscriber apparatus transmits the upstream signal indicating the completion of the wavelength switching at a wavelength after switching at the instructed transmission start time after the wavelength switching is completed in accordance with the instruction; and a transmission start time correction procedure in which the station-side subscriber accommodation apparatus measures a reception time of the upstream signal indicating the completion of the wavelength switching received after the wavelength switching and sets a time obtained by adding a time twice a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

2. The transmission start time correction method of the WDM/TDM-PON system according to claim 1, wherein the station-side subscriber accommodation apparatus performs setting of a receivable period of the upstream signal indicating the completion of the wavelength switching received after the wavelength switching to a period wider than a receivable period of the upstream signal indicating the completion of the wavelength switching assumed before the wavelength switching.

3. The transmission start time correction method of the WDM/TDM-PON system according to claim 2, wherein the station-side subscriber accommodation apparatus continues setting of the new transmission start time in the transmission start time correction procedure until an upstream signal propagation delay time is measured at the wavelength after the switching.

4. The transmission start time correction method of the WDM/TDM-PON system according to claim 1, wherein the station-side subscriber accommodation apparatus continues setting of the new transmission start time in the transmission start time correction procedure until an upstream signal propagation delay time is measured at the wavelength after the switching.

5. A transmission start time correction method in a WDM/TDM-PON system in which a station-side subscriber accommodation apparatus and a plurality of subscriber apparatuses are connected by PON topology and a subscriber apparatus switches a transmission wavelength, a transmission start time, and transmission duration in accordance with an instruction from the station-side subscriber accommodation apparatus, the transmission start time correction method comprising:

a wavelength switching procedure in which the station-side subscriber accommodation apparatus instructs the subscriber apparatus to perform wavelength switching and the subscriber apparatus performs the wavelength switching in accordance with the instruction;

a transmission instruction procedure in which the station-side subscriber accommodation apparatus issues an instruction including the transmission start time so that the subscriber apparatus transmits an upstream signal indicating completion of the wavelength switching of the subscriber apparatus at a wavelength after switching, after passage of a scheduled time of the wavelength switching of the subscriber apparatus;

a switching completion transmission procedure in which the subscriber apparatus transmits the upstream signal indicating the completion of the wavelength switching at the wavelength after the switching at the instructed transmission start time; and a transmission start time correction procedure in which the station-side subscriber accommodation apparatus measures a reception time of the upstream signal indicating the completion of the wavelength switching received after the wavelength switching and sets a time obtained by adding a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

6. The transmission start time correction method of the WDM/TDM-PON system according to claim 5, wherein the station-side subscriber accommodation apparatus performs setting of a receivable period of the upstream signal indicating the completion of the wavelength switching received after the wavelength switching to a period wider than a receivable period of the upstream signal indicating the completion of the wavelength switching assumed before the wavelength switching.

7. The transmission start time correction method of the WDM/TDM-PON system according to claim 6, wherein the station-side subscriber accommodation apparatus continues setting of the new transmission start time in the transmission start time correction procedure until an upstream signal propagation delay time is measured at the wavelength after the switching.

8. The transmission start time correction method of the WDM/TDM-PON system according to claim 5, wherein the station-side subscriber accommodation apparatus continues setting of the new transmission start time in the transmission start time correction procedure until an upstream signal propagation delay time is measured at the wavelength after the switching.

9. A WDM/TDM-PON system in which a station-side subscriber accommodation apparatus and a plurality of subscriber apparatuses are connected by PON topology and a subscriber apparatus switches a transmission wavelength, a transmission start time, and transmission duration in accordance with an instruction from the station-side subscriber accommodation apparatus,
  wherein the station-side subscriber accommodation apparatus issues an instruction using a downstream signal for instructing the subscriber apparatus to perform wavelength switching, the downstream signal including the transmission start time of an upstream signal indicating completion of the wavelength switching of the subscriber apparatus, the upstream signal being transmitted by the subscriber apparatus after the wavelength switching,
  the subscriber apparatus transmits the upstream signal indicating the completion of the wavelength switching at a wavelength after switching at the instructed transmission start time after the wavelength switching is completed in accordance with the instruction, and
  the station-side subscriber accommodation apparatus measures a reception time of the upstream signal indicating the completion of the wavelength switching received after the wavelength switching and sets a time obtained by adding a time twice a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

10. The WDM/TDM-PON system according to claim 9, wherein the station-side subscriber accommodation apparatus performs setting of a receivable period of the upstream signal indicating the completion of the wavelength switching received after the wavelength switching to a period wider than a receivable period of the upstream signal indicating the completion of the wavelength switching assumed before the wavelength switching.

11. The WDM/TDM-PON system according to claim 10, wherein the station-side subscriber accommodation apparatus continues setting of the new transmission start time until an upstream signal propagation delay time is measured at the wavelength after the switching.

12. The WDM/TDM-PON system according to claim 9, wherein the station-side subscriber accommodation apparatus continues setting of the new transmission start time until an upstream signal propagation delay time is measured at the wavelength after the switching.

13. A WDM/TDM-PON system in which a station-side subscriber accommodation apparatus and a plurality of subscriber apparatuses are connected by PON topology and a subscriber apparatus switches a transmission wavelength, a transmission start time, and transmission duration in accordance with an instruction from the station-side subscriber accommodation apparatus,
  wherein the station-side subscriber accommodation apparatus instructs the subscriber apparatus to perform wavelength switching and the subscriber apparatus performs the wavelength switching in accordance with the instruction,
  the station-side subscriber accommodation apparatus issues an instruction including the transmission start time so that the subscriber apparatus transmits an upstream signal indicating completion of the wavelength switching of the subscriber apparatus at a wavelength after switching, after passage of a scheduled time of the wavelength switching of the subscriber apparatus,
  the subscriber apparatus transmits the upstream signal indicating the completion of the wavelength switching at the wavelength after the switching at the instructed transmission start time, and
  the station-side subscriber accommodation apparatus measures a reception time of the upstream signal indicating the completion of the wavelength switching received after the wavelength switching and sets a time obtained by adding a time difference between a reception time of the upstream signal indicating the completion of the wavelength switching assumed before the wavelength switching and the reception time of the upstream signal indicating the completion of the wavelength switching received after the wavelength switching to the transmission start time of the upstream signal before the wavelength switching as a new transmission start time.

14. The WDM/TDM-PON system according to claim 13, wherein the station-side subscriber accommodation apparatus performs setting of a receivable period of the upstream signal indicating the completion of the wavelength switching received after the wavelength switching to a period wider than a receivable period of the upstream signal indicating the completion of the wavelength switching assumed before the wavelength switching.

15. The WDM/TDM-PON system according to claim 14, wherein the station-side subscriber accommodation apparatus continues setting of the new transmission start time until an upstream signal propagation delay time is measured at the wavelength after the switching.

16. The WDM/TDM-PON system according to claim 13, wherein the station-side subscriber accommodation apparatus continues setting of the new transmission start time until an upstream signal propagation delay time is measured at the wavelength after the switching.

* * * * *